US012644416B2

(12) United States Patent
Man et al.

(10) Patent No.: US 12,644,416 B2
(45) Date of Patent: Jun. 2, 2026

(54) LOW CARBON EMISSION HYDROGEN PRODUCTION

(71) Applicant: Saudi Arabian Oil Company, Dhahran (SA)

(72) Inventors: Yuk San Man, Dhahran (SA); Jose Choy Pernia, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 19/297,441

(22) Filed: Aug. 12, 2025

(65) Prior Publication Data

US 2026/0022662 A1     Jan. 22, 2026

Related U.S. Application Data

(62) Division of application No. 18/774,499, filed on Jul. 16, 2024, now Pat. No. 12,454,914.

(51) Int. Cl.
| | |
|---|---|
| *F02C 7/22* | (2006.01) |
| *C01B 3/36* | (2026.01) |
| *C01B 3/48* | (2006.01) |
| *F02C 6/00* | (2006.01) |

(52) U.S. Cl.
CPC .................. *F02C 7/22* (2013.01); *C01B 3/36* (2013.01); *C01B 3/48* (2013.01); *F02C 6/00* (2013.01); *C01B 2203/0255* (2013.01); *C01B* 2203/0283 (2013.01); *C01B 2203/0475* (2013.01); *C01B 2203/068* (2013.01); *C01B* 2203/1235 (2013.01)

(58) Field of Classification Search
CPC .................................... F02C 7/22; F02C 6/00
See application file for complete search history.

(56) References Cited

U.S. PATENT DOCUMENTS

| | | | | |
|---|---|---|---|---|
| 4,157,011 A | * | 6/1979 | Liddle | F02C 9/20 |
| | | | | 60/39.27 |
| 9,782,718 B1 | * | 10/2017 | Baker | B01D 53/22 |
| 10,829,371 B1 | * | 11/2020 | Harale | C01B 3/04 |
| 2022/0056835 A1 | * | 2/2022 | Voice | F02M 26/35 |
| 2022/0275753 A1 | * | 9/2022 | Råheim | C01F 11/18 |

* cited by examiner

*Primary Examiner* — David P. Olynick
(74) *Attorney, Agent, or Firm* — Fish & Richardson P.C.

(57) ABSTRACT

A hydrocarbon stream is reformed in the presence of oxygen and steam to produce a syngas stream. A hydrogen stream is separated from the syngas stream. The hydrogen stream is combusted to produce a steam stream. The steam stream is flowed to a turbine wheel of an electric generator, thereby causing the steam stream to expand while flowing across the turbine wheel and the turbine wheel to rotate. The electric generator generates electrical power in response to rotation of the turbine wheel. In this way, hydrogen produced by reforming can be utilized as a clean fuel source for cogeneration to produce useful heat and electricity while simultaneously decreasing the carbon footprint of the process.

16 Claims, 7 Drawing Sheets

100

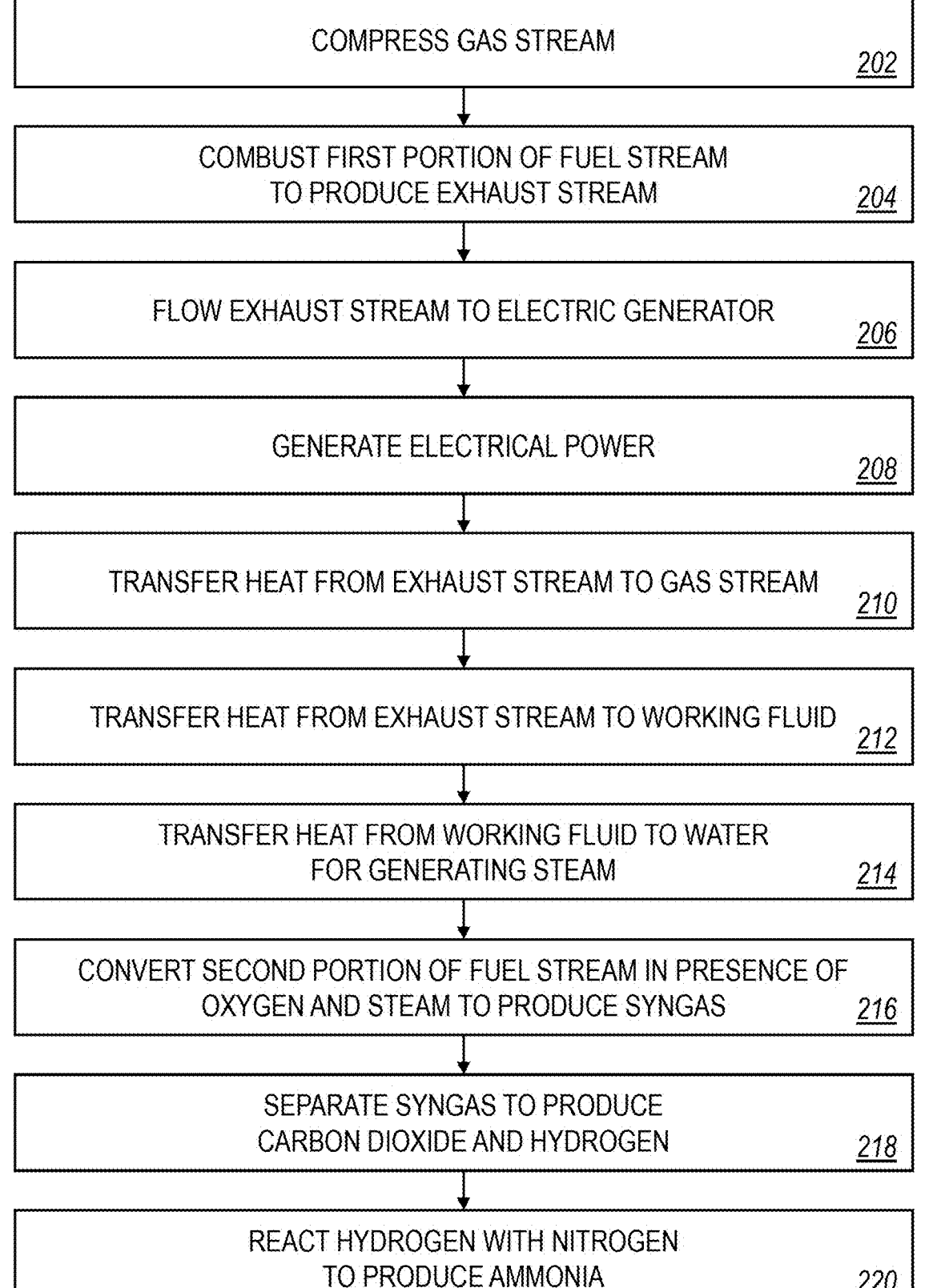

COMPRESS GAS STREAM

202

COMBUST FIRST PORTION OF FUEL STREAM
TO PRODUCE EXHAUST STREAM

204

FLOW EXHAUST STREAM TO ELECTRIC GENERATOR

206

GENERATE ELECTRICAL POWER

208

TRANSFER HEAT FROM EXHAUST STREAM TO GAS STREAM

210

TRANSFER HEAT FROM EXHAUST STREAM TO WORKING FLUID

212

TRANSFER HEAT FROM WORKING FLUID TO WATER
FOR GENERATING STEAM

214

CONVERT SECOND PORTION OF FUEL STREAM IN PRESENCE OF
OXYGEN AND STEAM TO PRODUCE SYNGAS

216

SEPARATE SYNGAS TO PRODUCE
CARBON DIOXIDE AND HYDROGEN

218

REACT HYDROGEN WITH NITROGEN
TO PRODUCE AMMONIA

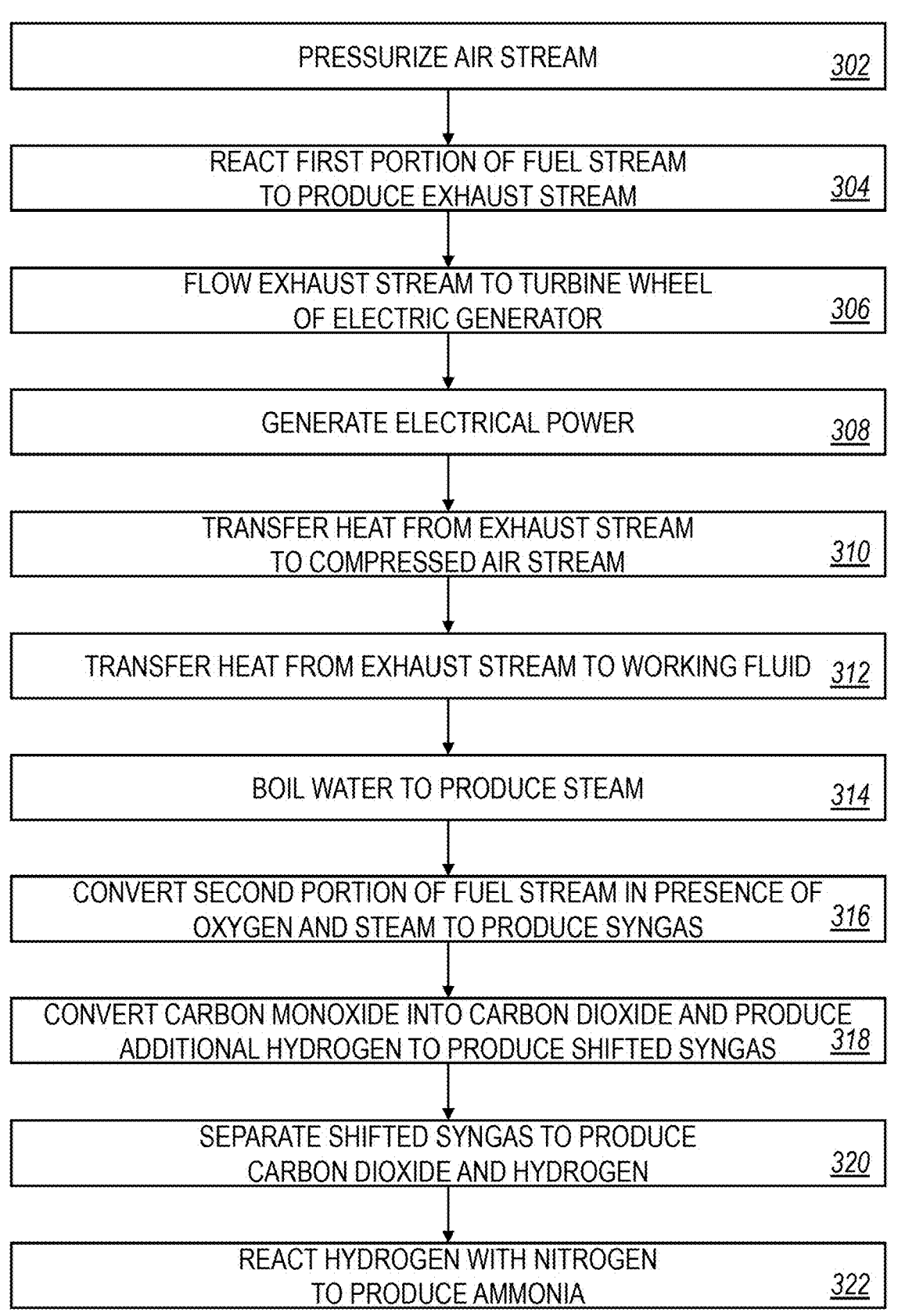

| PRESSURIZE AIR STREAM | 302 |

| REACT FIRST PORTION OF FUEL STREAM TO PRODUCE EXHAUST STREAM | 304 |

| FLOW EXHAUST STREAM TO TURBINE WHEEL OF ELECTRIC GENERATOR | 306 |

| GENERATE ELECTRICAL POWER | 308 |

| TRANSFER HEAT FROM EXHAUST STREAM TO COMPRESSED AIR STREAM | 310 |

| TRANSFER HEAT FROM EXHAUST STREAM TO WORKING FLUID | 312 |

| BOIL WATER TO PRODUCE STEAM | 314 |

| CONVERT SECOND PORTION OF FUEL STREAM IN PRESENCE OF OXYGEN AND STEAM TO PRODUCE SYNGAS | 316 |

| CONVERT CARBON MONOXIDE INTO CARBON DIOXIDE AND PRODUCE ADDITIONAL HYDROGEN TO PRODUCE SHIFTED SYNGAS | 318 |

| SEPARATE SHIFTED SYNGAS TO PRODUCE CARBON DIOXIDE AND HYDROGEN | 320 |

| REACT HYDROGEN WITH NITROGEN TO PRODUCE AMMONIA | 322 |

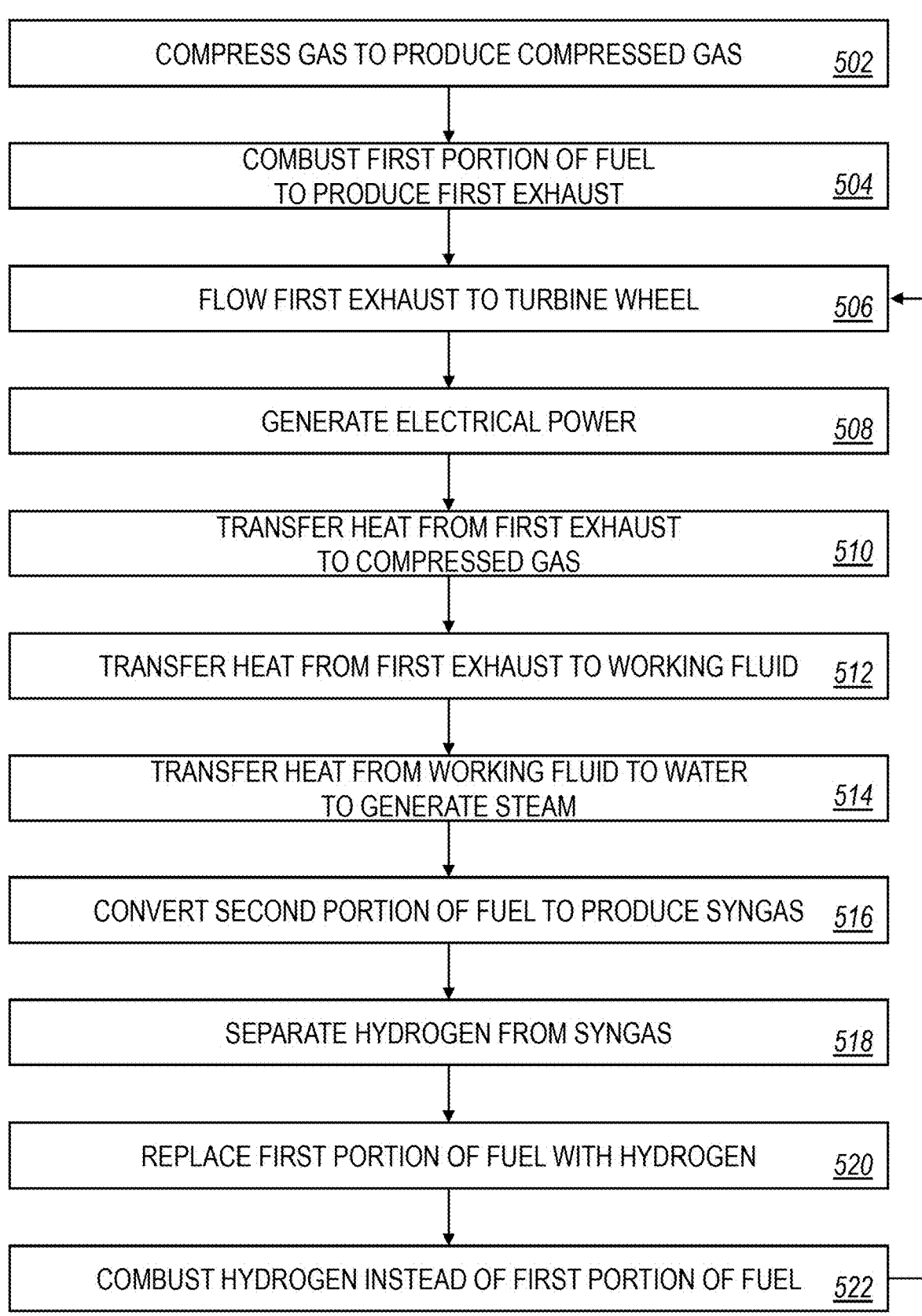

| COMPRESS GAS TO PRODUCE COMPRESSED GAS | 502 |

| COMBUST FIRST PORTION OF FUEL TO PRODUCE FIRST EXHAUST | 504 |

| FLOW FIRST EXHAUST TO TURBINE WHEEL | 506 |

| GENERATE ELECTRICAL POWER | 508 |

| TRANSFER HEAT FROM FIRST EXHAUST TO COMPRESSED GAS | 510 |

| TRANSFER HEAT FROM FIRST EXHAUST TO WORKING FLUID | 512 |

| TRANSFER HEAT FROM WORKING FLUID TO WATER TO GENERATE STEAM | 514 |

| CONVERT SECOND PORTION OF FUEL TO PRODUCE SYNGAS | 516 |

| SEPARATE HYDROGEN FROM SYNGAS | 518 |

| REPLACE FIRST PORTION OF FUEL WITH HYDROGEN | 520 |

| COMBUST HYDROGEN INSTEAD OF FIRST PORTION OF FUEL | 522 |

LOW CARBON EMISSION HYDROGEN PRODUCTION

CROSS-REFERENCE TO RELATED PATENT APPLICATION(S)

This application is a divisional of and claims the benefit of priority to U.S. application Ser. No. 18/774,499, filed Jul. 16, 2024, the contents of which are incorporated by reference herein.

TECHNICAL FIELD

This disclosure relates to hydrogen production.

BACKGROUND

Hydrocarbon reforming involves chemical synthesis of hydrogen gas from hydrocarbons (such as methane) by use of a catalyst or via a partial oxidation process. Steam reforming (sometimes referred to as steam methane reforming) is a type of methane reforming in which hydrocarbons are converted in the presence of steam to form syngas (a mixture of hydrogen and carbon monoxide). In some cases, the syngas can react further to produce carbon dioxide and more hydrogen. Autothermal reforming (ATR) is another type of methane reforming in which oxygen is directly combusted to form syngas. Processes can also include controlled partial oxidation to reform hydrocarbon gas. Components of the syngas (such as carbon monoxide and hydrogen) can be separated and processed to form different chemicals, such as methanol and ammonia. Similarly, syngas can further be processed in the presence of water (for example, in the form of steam) to convert carbon monoxide into carbon dioxide and additional hydrogen.

Hydrocarbon processing (such as hydrocarbon reforming) can result in the production of carbon dioxide, which is a known greenhouse gas. There is a growing interest in the energy transition from fossil fuels to renewable energy and sustainable energy in a global effort to reduce carbon emissions. Some examples of de-carbonization pathways in the energy transition to renewable energy include increasing energy efficiency, producing and/or using lower-carbon fuels, carbon capture and storage (CCS), and conversion of carbon dioxide into other, more useful chemicals.

SUMMARY

This disclosure describes technologies relating to hydrogen production. This disclosure also describes technologies relating to ammonia production. Certain aspects of the subject matter described can be implemented as a method. A hydrocarbon stream undergoes reforming in the presence of oxygen and steam to produce a syngas stream. A hydrogen stream is separated from the syngas stream. The hydrogen stream is combusted to produce a steam stream. The steam stream is flowed to a turbine wheel of an electric generator, thereby causing the steam stream to expand while flowing across the turbine wheel and the turbine wheel to rotate. The electric generator generates electrical power in response to rotation of the turbine wheel.

This, and other aspects, can include one or more of the following features. In some implementations, the turbine wheel of the electric generator is coupled to a shaft of a compressor. In some implementations, the compressor comprises an impeller coupled to the shaft. In some implementations, the shaft and the impeller of the compressor rotate with the turbine wheel. In some implementations, rotation of the impeller of the compressor provides compression work. In some implementations, the syngas stream, produced from reforming the hydrocarbon stream, comprises carbon monoxide and hydrogen. In some implementations, the method comprises converting at least a portion of the carbon monoxide of the syngas stream to produce carbon dioxide and additional hydrogen, thereby producing a shifted syngas stream prior to separating the hydrogen stream. In some implementations, the hydrogen stream is separated from the shifted syngas stream. In some implementations, separating the hydrogen stream from the shifted syngas stream comprises separating the carbon dioxide from the shifted syngas stream to produce a carbon dioxide stream. In some implementations, separating the hydrogen stream from the shifted syngas stream comprises separating hydrogen from a remaining portion of the shifted syngas stream after the carbon dioxide has been separated to produce the hydrogen stream. In some implementations, at least a portion of heat produced from the combustion of the hydrogen stream is provided as a heat source for reforming the hydrocarbon stream. In some implementations, at least a portion of heat produced from the combustion of the hydrogen stream is provided to a boiler for producing additional steam.

Certain aspects of the subject matter described can be implemented as a method. A gas stream comprising oxygen is compressed to produce a compressed gas stream. A first portion of a fuel stream comprising hydrogen atoms is combusted in the presence of the compressed gas stream to produce a first exhaust stream. The first exhaust stream is flowed to a turbine wheel of an electric generator, thereby causing the first exhaust stream to expand while flowing across the turbine wheel and the turbine wheel to rotate. The electric generator generates electrical power in response to rotation of the turbine wheel. Heat from the first exhaust stream is transferred to the compressed gas stream. After transferring heat from the compressed gas stream to the first exhaust stream, heat from the exhaust stream is transferred to a working fluid. After transferring heat from the exhaust stream to the working fluid, heat from the working fluid is transferred to a water stream to generate a steam stream. A second portion of the fuel stream is converted in the presence of oxygen and steam to produce a syngas stream. At least a portion of the steam is sourced from the steam stream generated from the water stream. A hydrogen stream is separated from the syngas stream. The first portion of the fuel stream is replaced with the hydrogen stream. The hydrogen stream is combusted, instead of the first portion of the fuel stream, in the presence of the compressed gas stream to produce a second exhaust stream.

This, and other aspects, can include one or more of the following features. In some implementations, the compressor is coupled to the electric generator. In some implementations, the compressor comprises an impeller coupled to a shaft. In some implementations, the shaft of the compressor is coupled to the turbine wheel of the electric generator and rotates with the turbine wheel. In some implementations, rotation of the impeller of the compressor causes the air stream to pressurize. In some implementations, the method comprises flowing at least a portion of the steam stream to a second turbine wheel of a second electric generator, thereby causing the portion of the steam stream to expand while flowing across the second turbine wheel and the second turbine wheel to rotate. In some implementations, the method comprises generating, by the second electric generator, electrical power in response to rotation of the second turbine wheel. In some implementations, the syngas stream comprises carbon monoxide and hydrogen. In some implementations, the method comprises converting, within a shift reactor, at least a portion of the carbon monoxide of the syngas stream to produce carbon dioxide and additional hydrogen, thereby producing a shifted syngas stream prior to separating the hydrogen stream. In some implementations, the hydrogen stream is separated from the shifted syngas stream. In some implementations, separating the hydrogen stream from the shifted syngas stream comprises separating carbon dioxide from the shifted syngas stream to produce a carbon dioxide stream. In some implementations, separating the hydrogen stream from the shifted syngas stream comprises separating hydrogen from a remaining portion of the shifted syngas stream after the carbon dioxide has been separated to produce the hydrogen stream. In some implementations, the electric generator generates sufficient electrical power for converting the second portion of the fuel stream, converting at least the portion of carbon monoxide of the syngas stream, and separating the shifted syngas stream, independent of power importation. In some implementations, the first exhaust stream comprises approximately 75 mole percent (mol. %) nitrogen and a balance of oxygen, carbon dioxide, and water. In some implementations, the nitrogen that is reacted with the hydrogen stream is at least partially sourced from the exhaust stream. In some implementations, at least a portion of heat produced from the combustion of the hydrogen stream is provided as a heat source for converting the second portion of the fuel stream to produce the syngas stream. In some implementations, at least a portion of heat produced from the combustion of the hydrogen stream is provided as a heat source for generating the steam stream. In some implementations, at least a portion of heat produced from the combustion of the hydrogen stream is provided as to a boiler for producing additional steam.

Certain aspects of the subject matter described can be implemented as a system. The system comprises a fuel stream comprising hydrogen atoms. The system comprises a reforming unit configured to receive and react a first portion of the fuel stream with steam and oxygen to produce a syngas stream. The system comprises a separation unit configured to separate a hydrogen stream from the syngas stream. The system comprises a power and utility unit configured to receive at least a portion of the hydrogen stream from the separation unit. The power and utility unit comprises a compressor configured to receive and compress a gas stream comprising oxygen to produce a compressed gas stream. The power and utility unit comprises a complementary firing chamber configured to receive the compressed gas stream and at least one of a second portion of the fuel stream or the portion of the hydrogen stream. The complementary firing chamber is configured to combust at least one of the second portion of the fuel stream or the portion of the hydrogen stream in the presence of the oxygen of the compressed gas stream to produce an exhaust stream. The power and utility unit comprises an electric generator in fluid communication with the complementary firing chamber. The electric generator is configured to receive the exhaust stream and generate electrical power in response to expansion of the exhaust stream through the electric generator.

This, and other aspects, can include one or more of the following features. In some implementations, the electric generator is coupled to the compressor. In some implementations, the electric generator comprises a turbine wheel configured to rotate in response to the exhaust stream flowing and expanding across the turbine wheel of the electric generator. In some implementations, the compressor comprises an impeller coupled to a shaft. In some implementations, the shaft of the compressor is coupled to the turbine wheel of the electric generator and rotates with the turbine wheel for compressing the gas stream. In some implementations, the power and utility unit comprises a boiler configured to receive a water stream and boil the water stream to produce steam. In some implementations, the power and utility unit comprises a second electric generator in fluid communication with the boiler. In some implementations, the second electric generator is configured to receive at least a portion of the steam produced by the boiler and generate electrical power in response to expansion of the steam through the second electric generator. In some implementations, the syngas stream produced by the reforming unit comprises carbon monoxide and hydrogen. In some implementations, the system comprises a shift reactor configured to receive the syngas stream from the reforming unit and convert at least a portion of the carbon monoxide of the syngas stream to produce carbon dioxide and additional hydrogen, thereby producing a shifted syngas stream. In some implementations, the separation unit is configured to receive the shifted syngas stream from the shift reactor and separate carbon dioxide from the shifted syngas stream to produce a carbon dioxide stream. In some implementations, the separation unit is configured to separate hydrogen from a remaining portion of the shifted syngas stream after the carbon dioxide has been separated to produce the hydrogen stream. In some implementations, the power and utility unit is configured to generate sufficient electrical power for delivery to the compressor for compressing the gas stream to produce the compressed gas stream, to the reforming unit for reacting the first portion of the fuel stream with steam and oxygen to produce the syngas stream, and to the separation unit for separating carbon dioxide from the shifted syngas stream to produce the carbon dioxide stream and for separating hydrogen from the remaining portion of the shifted syngas stream to produce the hydrogen stream, independent of power importation. In some implementations, the system comprises a hydrogen flowline from the separation unit to the complementary firing chamber. In some implementations, the hydrogen flowline is configured to flow at least the portion of the hydrogen stream from the separation unit to the complementary firing chamber. In some implementations, the complementary firing chamber is configured to combust at least the portion of the hydrogen stream in the presence of the oxygen of the compressed gas stream to produce the exhaust stream, wherein the exhaust stream comprises water. In some implementations, the water stream comprises at least a portion of the water of the exhaust stream. In some implementations, the boiler is configured to receive at least a portion of heat produced from the combustion of the hydrogen stream to produce the steam stream. In some implementations, the reforming unit is configured to receive at least a portion of heat produced from the combustion of the hydrogen stream to produce the syngas stream.

The details of one or more implementations of the subject matter of this disclosure are set forth in the accompanying drawings and the description. Other features, aspects, and advantages of the subject matter will become apparent from the description, the drawings, and the claims.

DESCRIPTION OF DRAWINGS

FIG. 2 is a flow chart of an example method for producing ammonia.

FIG. 3 is a flow chart of an example method for producing ammonia.

FIG. 5 is a flow chart of an example method for utilizing hydrogen produced by a reforming process as fuel to generate power.

DETAILED DESCRIPTION

Figure 1A:
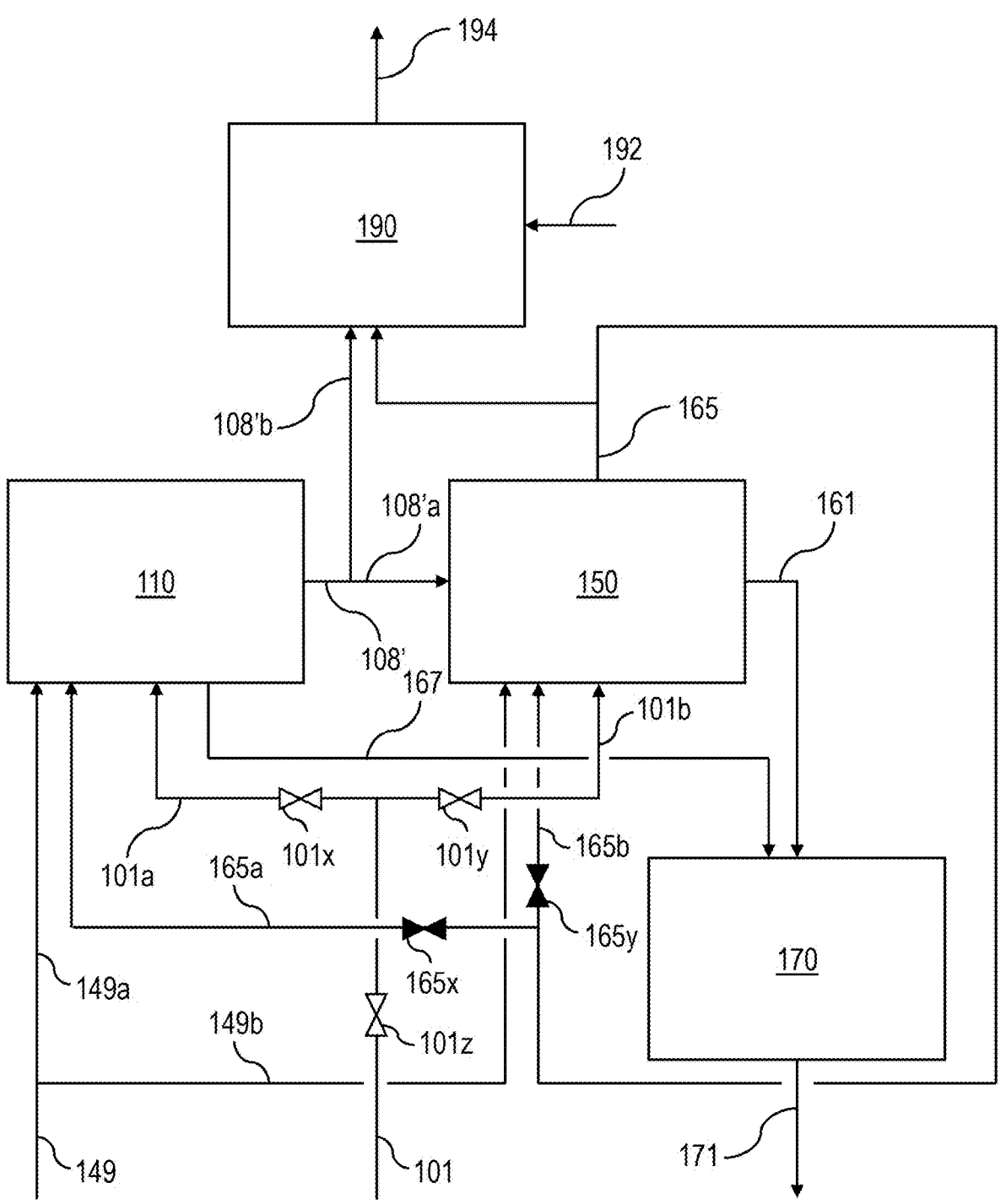
FIG. 1A is a schematic diagram of an example system for producing ammonia.

This disclosure describes thermally efficient production of ammonia with co-generation of power. Ammonia can be produced as a reaction product between nitrogen and hydrogen. Hydrogen can be produced by the production of syngas from fuel feedstocks. There is a growing interest in the energy transition from fossil fuels to renewable energy and sustainable energy in a global effort to reduce carbon emissions. Some examples of decarbonization pathways in the energy transition to renewable energy include increasing energy efficiency, producing and/or using lower-carbon fuels, and carbon capture and storage (CCS). ammonia is ammonia that has been produced by a process/system that captures, uses, and/or sequesters carbon dioxide that is produced as a result of the production of the ammonia. Similarly, hydrogen is hydrogen that has been produced by a process/system that captures, uses, and/or sequesters carbon dioxide that has been produced as a result of the production of the hydrogen. As such, production of hydrogen and ammonia can be considered decarbonization pathways toward a sustainable and reduced carbon economy.

Hydrogen produced by reforming processes is utilized as a fuel source for cogeneration to produce useful heat and electricity. Hydrogen can be used as a clean fuel because combustion of hydrogen does not produce carbon dioxide. By utilizing hydrogen produced by reforming processes as an alternative to conventional fuels (such as hydrocarbons), the described systems and methods can reduce carbon emissions. The described systems and methods can be implemented on any reforming processes that produced hydrogen. Some examples of reforming processes to which the described systems and methods can be applied include autothermal reforming, steam reforming, and partial oxidation. One non-limiting example to which the described systems and methods can be applied is an ammonia production system which includes generation of ammonia from hydrogen which has been produced from reforming and co-firing gas turbines for generating electricity and heat integration, in which waste heat is recovered for generating steam.

The subject matter described in this disclosure can be implemented in particular implementations, so as to realize one or more of the following advantages. The carbon dioxide produced by the systems and methods described is sequestration-ready in that it is ready for transport (for example, by a pipeline) to be sequestered in a subterranean zone in the Earth as opposed to being released to the atmosphere and contributing to carbon emissions. Thus, the carbon dioxide produced can be sequestered and/or used in another industrial process instead of being released to the atmosphere. The described systems and methods are flexible in that they can receive a range of fuel feedstocks, such as conventional hydrocarbons (for example, natural gas, methane, biogas, or another suitable fuel source). The described systems and methods employ heat integration for recovering and efficiently using waste heat. The described systems and methods can generate useful electrical power from the recovered waste heat while also producing useful chemical products, such as hydrogen and ammonia. Further, the electrical power generated by the described systems and methods can be used within the systems and methods for increasing power efficiency. The described systems and methods can reduce and/or eliminate the need to import power to perform operations, thereby further reducing the carbon footprint of the overall system/method. Hydrogen produced via reforming by the systems and methods can be recycled and used as fuel to generate power and heat without contributing to additional carbon emissions, as hydrogen is a clean fuel. The recycling and use of hydrogen as fuel therefore further reduces the carbon footprint of the described systems and methods. Because hydrogen produced by the described systems and methods can be used as fuel (in favor of different fuels that produce carbon dioxide upon combustion, such as methane), the hydrogen produced by the described systems and methods can exhibit a similar carbon footprint as green hydrogen.

FIG. 1A depicts a system 100 that can produce ammonia. The system 100 includes a hydrogen production subsystem 150 and an ammonia production subsystem 190. The system 100 includes a power and utility subsystem 110 and a carbon dioxide recovery subsystem 170. The power and utility subsystem 110 can be electrically connected to the hydrogen production subsystem 150, the ammonia production subsystem 190, the carbon dioxide recovery subsystem 170, or combinations of these for providing electrical power. The power and utility subsystem 100 can provide other utilities (such as steam) to the hydrogen production subsystem 150, the ammonia production subsystem 190, the carbon dioxide recovery subsystem 170, or combinations of these. The system 100 includes a fuel stream 101 that includes hydrogen atoms. For example, the fuel stream 101 includes a hydrocarbon (such as an alkane, an alkene, an alkyne, a cyclic hydrocarbon, an aromatic hydrocarbon, and/or a non-aromatic hydrocarbon). Some non-limiting examples of the fuel stream 101 include a stream including methane or natural gas (which includes methane). A first portion 101a of the fuel stream 101 flows to the power and utility subsystem 110. A second portion 101b of the fuel stream 101 flows to the hydrogen production subsystem 150. The power and utility subsystem 110 generates power and steam using the first portion 101a of the fuel stream 101. At least a portion of the steam 108' (for example, steam 108'a) generated by the power and utility subsystem 110 flows to the hydrogen production subsystem 150. The hydrogen production subsystem 150 generates hydrogen using the second portion 101b of the fuel stream 101 and the steam 108'a provided by the power and utility subsystem 110. The hydrogen 165 generated by the hydrogen production subsystem 150 flows to the ammonia production subsystem 190. In some implementations, at least a portion of the steam 108' (for example, steam 108'b) generated by the power and utility subsystem 110 flows to the ammonia production subsystem 190. The ammonia production subsystem 190 reacts the hydrogen 165 with nitrogen 192 to produce ammonia 194.

The system 100 can include a valve 101x configured to control flow of the first portion 101a of the fuel stream 101 flowing to the power and utility subsystem 110. At startup of the system 100, valve 101x is open, allowing the first portion 101a of the fuel stream 101 to flow to the power and utility subsystem 110. The system includes a valve 101y configured to control flow of the second portion 101b of the fuel stream 101 flowing to the hydrogen production subsystem 150. At startup of the system 100, valve 101y is open, allowing the second portion 101b of the fuel stream 101 to flow to the hydrogen production subsystem 150.

The system 100 can include a valve 165x configured to control flow of a first portion 165a of the hydrogen 165 (produced by the hydrogen production subsystem 150) to the power and utility subsystem 110. At startup of the system 100, valve 165x is closed because hydrogen 165 has not yet been produced by the hydrogen production subsystem 150. Thus, at startup of the system 100, the first portion 165a of the hydrogen 165 does not flow to the power and utility subsystem 110. The system 100 includes a valve 165y configured to control flow of a second portion 165b of the hydrogen 165 to the hydrogen production subsystem 150. At startup of the system 100, valve 165y is closed because hydrogen 165 has not yet been produced by the hydrogen production subsystem 150. Thus, at startup of the system 100, the second portion 165b of the hydrogen 165 does not flow to the hydrogen production subsystem 150.

The system 100 can include a hydrocarbon feedstock 149. The hydrocarbon feedstock 149 includes a hydrocarbon. For example, the hydrocarbon feedstock 149 includes methane. The hydrocarbon feedstock 149 can include a mixture of gases (including a hydrocarbon). For example, the hydrocarbon feedstock 149 can include natural gas. As another example, the hydrocarbon feedstock 149 can include various hydrocarbons, such as methane, propane, and butane. The hydrocarbon feedstock 149 can be used as an alternative feedstock or supplement the fuel stream 101. In some implementations, as shown in FIG. 1A, a first portion 149a of the hydrocarbon feedstock 149 flows to the power and utility subsystem 110. In some implementations, as shown in FIG. 1A, a second portion 149b of the hydrocarbon feedstock 149 flows to the hydrogen production subsystem 150. In some implementations, a third portion (not shown) of the hydrocarbon feedstock 149 can replace or supplement the fuel stream 101.

At startup of the system 100, fuel stream 101 is supplied to the power and utility subsystem 110 and the hydrogen production subsystem 150 via first and second portions 101a and 101b, respectively. In some implementations, as shown in FIG. 1A, the first portion 149a of the hydrocarbon feedstock 149 supplies additional fuel to the power and utility subsystem 110 at startup of system 100. In some implementations, as shown in FIG. 1A, the second portion 149b of the hydrocarbon feedstock 149 supplies feedstock to the hydrogen production subsystem 150 (for example, to a reformer) at startup of system 100.

After startup of the system 100 has completed and the hydrogen production subsystem 150 has begun to produce the hydrogen 165, valve 101x can be partially or fully closed, and valve 101y can be partially or fully closed. In some implementations, the system 100 includes a valve 101z upstream of the mixing point of the fuel stream 101. In some implementations, after startup of the system 100 has completed and the hydrogen production subsystem 150 has begun to produce the hydrogen 165, valve 101z can be partially or fully closed. After startup of the system 100 has completed and the hydrogen production subsystem 150 has begun to produce the hydrogen 165, valves 165x and 165y can be partially or fully opened. By at least partially opening valve 165x and at least partially closing valve 101x and/or 101z, the first portion 165a of the hydrogen 165 (produced by the hydrogen production subsystem 150) can partially or fully replace the first portion 101a of the fuel stream 101 provided to the power and utility subsystem 110. By opening valve 165y and at least partially closing valve 101y and/or 101z, the second portion 165b of the hydrogen 165 can partially or fully replace the second portion 101b of the fuel stream 101 provided to the hydrogen production subsystem 150.

Figure 1B:
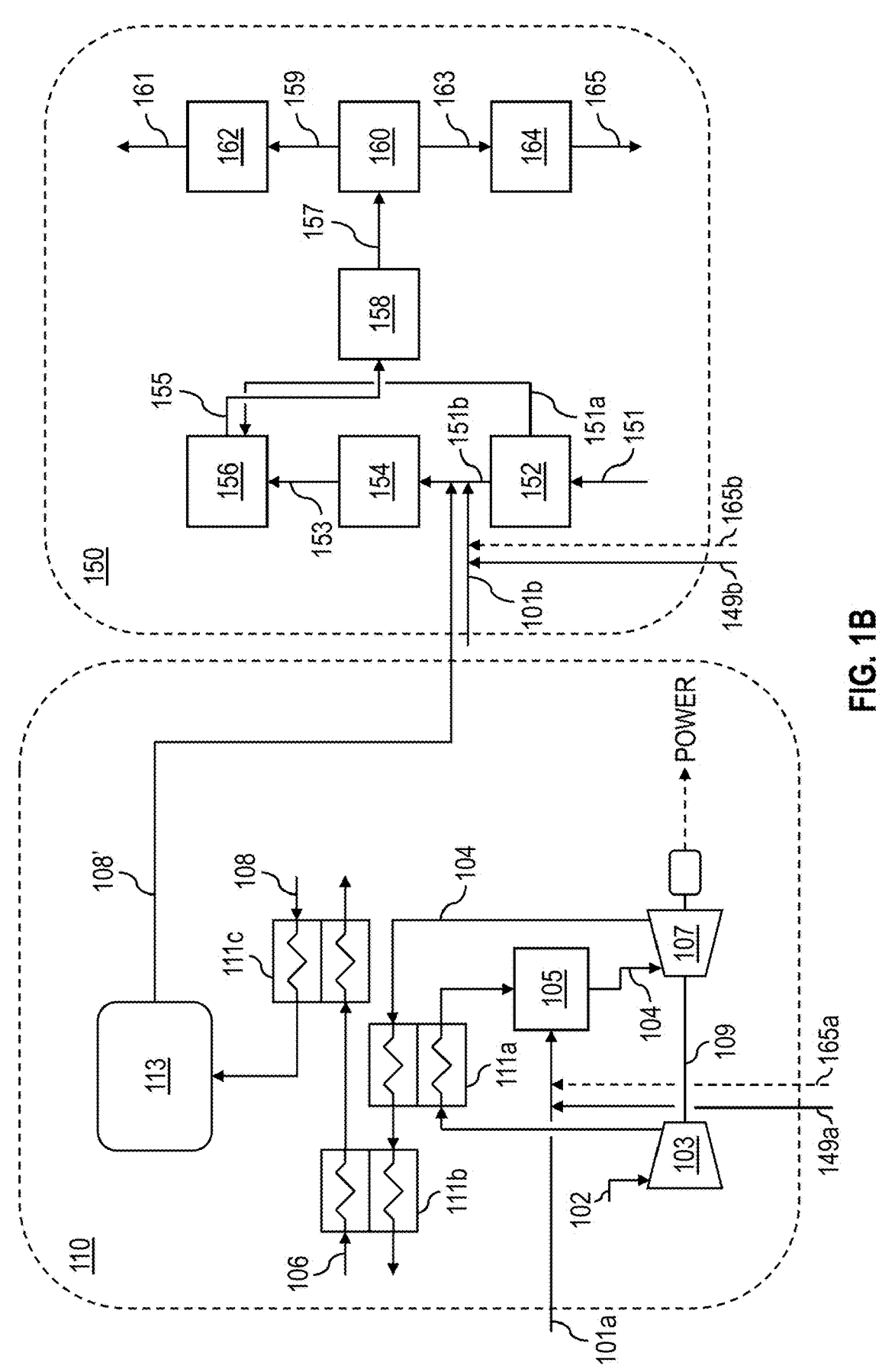
FIG. 1B is a schematic diagram showing various components of the system shown in FIG. 1A.

The hydrogen production subsystem 150 and the power and utility subsystem 110 are shown in more detail in FIG. 1B. The power and utility subsystem 110 includes a compressor 103. A gas stream 102 flows to the compressor 103. The gas stream 102 includes oxygen. In some implementations, the gas stream 102 is a stream of air, which includes oxygen. The compressor 103 includes an inlet configured to receive the gas stream 102. The compressor 103 includes an impeller that can rotate. Rotation of the impeller of the compressor 103 can cause the gas stream 102 to pressurize (compress). The compressor 103 includes an outlet configured to discharge the compressed gas stream 102. The gas stream 102 exiting the outlet of the compressor 103 has an operating pressure greater than that of the gas stream 102 entering the inlet of the compressor 103. In some implementations, the gas stream 102 entering the inlet of the compressor 103 has an operating pressure substantially equal to atmospheric pressure. In some implementations, the gas stream 102 exiting the outlet of the compressor 103 has an operating pressure of up to about 25 bar absolute (bara). In some implementations, the gas stream 102 entering the inlet of the compressor 103 has an operating temperature in a range of from about −20 degrees Celsius (° C.) to about 50° C. In some implementations, the gas stream 102 exiting the outlet of the compressor 103 has an operating temperature of up to about 600° C.

The power and utility subsystem 110 includes a first heat exchanger 111a. The first heat exchanger 111a includes a first side and a second side. The gas stream 102 flows from the compressor 103 to the first side of the first heat exchanger 111a. The first side of the first heat exchanger 111a includes an inlet configured to receive the gas stream 102 from the compressor 103. The compressed gas stream 102 flows through the first side of the first heat exchanger 111a. The first side of the first heat exchanger 111a includes an outlet configured to discharge the gas stream 102. The gas stream 102 exiting the outlet of the first side of the first heat exchanger 111a can have an operating temperature greater (hotter) than that of the gas stream 102 entering the inlet of the first side of the first heat exchanger 111a. In some implementations, the gas stream 102 exiting the outlet of the first side of the first heat exchanger 111a has an operating temperature of in a range of from about 160° C. to about 600° C.

The power and utility subsystem 110 includes a complementary firing (co-firing) chamber 105. The co-firing chamber 105 is a combustion chamber that is capable of combusting a variety of combustible fuels. The gas stream 102 flows from the first heat exchanger 111a to the co-firing chamber 105. The co-firing chamber 105 includes an inlet configured to receive the gas stream 102 from the first side of the first heat exchanger 111a. The first portion 101a of the fuel stream 101 flows to the co-firing chamber 105. In some implementations, the first portion 101a of the fuel stream 101 mixes with the gas stream 102 upstream of the co-firing chamber 105, and the mixture of the first portion 101a of the fuel stream 101 and the gas stream 102 flows into the co-firing chamber 105 via the inlet. In some implementations, the first portion 101a of the fuel stream 101 flows into the co-firing chamber 105 separately from the gas stream 102, for example, via a different inlet of the co-firing chamber 105. In some implementations, the first portion 101*a* of the fuel stream 101 entering the co-firing chamber 105 has an operating temperature in a range of from about 400° C. to about 600° C. In some implementations, the first portion 101*a* of the fuel stream 101 entering the co-firing chamber 105 has an operating temperature greater than about 600° C. In some implementations, the first portion 101*a* of the fuel stream 101 entering the co-firing chamber 105 has an operating pressure in a range of from about 20 bara to about 25 bara. In some implementations, the first portion 101*a* of the fuel stream 101 entering the co-firing chamber 105 has an operating pressure greater than about 25 bara. The co-firing chamber 105 combusts the first portion 101*a* of the fuel stream 101 in the presence of the gas stream 102, which includes oxygen. Combustion of the first portion 101*a* of the fuel stream 101 within the co-firing chamber 105 releases heat and produces carbon dioxide in cases in which the fuel stream 101 includes hydrocarbons or other carbon-containing fuel. The flow rates of the gas stream 102 and the first portion 101*a* of the fuel stream 101 entering the co-firing chamber 105 can be adjusted based on desired operating parameters of the co-firing chamber 105. For example, the flow rates of the gas stream 102 and the first portion 101*a* of the fuel stream 101 entering the co-firing chamber 105 can be adjusted, such that a ratio of the oxygen from the gas stream 102 to combustibles in the first portion 101*a* of the fuel stream 101 is sufficient for complete combustion of the first portion 101*a* of the fuel stream 101 within the co-firing chamber 105. The co-firing chamber 105 includes an outlet configured to discharge an exhaust stream 104 from the co-firing chamber 105. The exhaust stream 104 is the resultant fluid stream (gas) from combustion of the first portion 101*a* of the fuel stream 101 in the presence of the gas stream 102. The exhaust stream 104 can include the combustion products produced in the co-firing chamber 105 (such as carbon dioxide and water) and remaining components from the gas stream 102, for example, that may not have reacted within the co-firing chamber 105 (such as nitrogen). The exhaust stream 104 exiting the outlet of the co-firing chamber 105 can have an operating temperature greater (hotter) than those of the gas stream 102 and first portion 101*a* of the fuel stream 101 entering the co-firing chamber 105. The exhaust stream 104 can include, for example, water (steam), nitrogen ($N_2$), oxygen ($O_2$), and carbon dioxide ($CO_2$). In some cases, the exhaust stream 104 also includes additional components, such as nitrogen oxide (NOx), carbon monoxide (CO), and any remaining fuel from the first portion 101*a* of the fuel stream 101 that did not combust in the co-firing chamber 105. In some implementations, the exhaust stream 104 includes steam in a range of from about 3 mole percent (mol. %) to about 9 mol. % (for example, about 6 mol. % steam). In some implementations, the exhaust stream 104 includes nitrogen in a range of from about 70 mol. % to about 80 mol. % (for example, about 77 mol. % nitrogen). In some implementations, the exhaust stream 104 includes oxygen in a range of from about 10 mol. % to about 20 mol. % (for example, about 14 mol. % oxygen). In some implementations, the exhaust stream 104 includes carbon dioxide in a range of from about 1 mol. % to about 5 mol. % (for example, about 3 mol. % carbon dioxide). In some implementations, the exhaust stream 104 exiting the outlet of the co-firing chamber 105 has an operating temperature in a range of from about 1,000° C. to about 1,300° C. In some implementations, the exhaust stream 104 exiting the outlet of the co-firing chamber 105 has an operating pressure of about 25 bara. The operating pressure of the exhaust stream 104 exiting the outlet of the co-firing chamber 105 can be adjusted based on power generation requirements for the electric generator 107, described in further detail later.

The power and utility subsystem 110 includes the electric generator 107. The electric generator 107 can include a gas turbine that includes a stator and rotor. The rotor of the gas turbine can include an impeller. The exhaust stream 104 flows from the co-firing chamber 105 to the electric generator 107. The gas turbine of the electric generator 107 can include an inlet configured to receive the exhaust stream 104. As the exhaust stream 104 flows through the gas turbine and expands (decreases pressure), the impeller of the gas turbine rotates. Rotation of the impeller (a part of the rotor) in relation to the stator of the electric generator 107 generates electrical power. The electrical power generated by the electric generator 107 can, for example, be provided to and used by any component of system 100 that requires power to operate. For example, the electrical power generated by the electric generator 107 can be provided to a component of the hydrogen production subsystem 150, to a component of the ammonia production subsystem 190, to a component used in sequestering carbon dioxide (such as a component of the carbon dioxide recovery subsystem 170), or any combinations of these. The gas turbine of the electric generator 107 can include an outlet configured to discharge the exhaust stream 104. The exhaust stream 104 exiting the outlet of the electric generator 107 has an operating pressure less than that of the exhaust stream 104 entering the inlet of the electric generator 107. Expansion of the exhaust stream 104 flowing through the gas turbine of the electric generator 107 can cause the exhaust stream 104 to cool. Thus, the exhaust stream 104 exiting the outlet of the electric generator 107 can have an operating temperature less (colder) than that of the exhaust stream 104 entering the inlet of the electric generator 107. As shown in FIG. 1B, the electric generator 107 can be coupled to the compressor 103 via a shaft 109. For example, the impeller of the gas turbine can be coupled to the shaft 109, and the impeller of the compressor 103 can be coupled to the shaft 109. Rotation of the gas turbine can drive rotation of the impeller of the compressor 103 to pressurize the gas stream 102. In some implementations, the impeller of the gas turbine (electric generator 107) and the impeller of the compressor 103 are coupled to the shaft 109, such that the respective impellers co-rotate. In some implementations, the impeller of the gas turbine (electric generator 107) and the impeller of the compressor 103 are coupled to the shaft 109 by a gearbox, gear train, or clutch mechanism, such that the respective impellers rotate at different rotational speeds. In some implementations, the exhaust stream 104 exiting the outlet of the electric generator 107 has an operating temperature in a range of from about 650° C. to about 800° C. In some implementations, the exhaust stream 104 exiting the outlet of the electric generator 107 has an operating pressure in a range of from about 2 bara to about 5 bara.

The exhaust stream 104 flows from the electric generator 107 to the second side of the first heat exchanger 111*a*. The second side of the first heat exchanger 111*a* includes an inlet configured to receive the exhaust stream 104 from the electric generator 107. The exhaust stream 104 flows through the second side of the first heat exchanger 111*a*. The first heat exchanger 111*a* is configured to transfer heat from the exhaust stream 104 flowing through the second side to the gas stream 102 flowing through the first side. The gas stream 102 and the exhaust stream 104 do not come into direct contact with one another in the first heat exchanger 111a. Instead, the first heat exchanger 111a provides an intermediary heat transfer area to facilitate transfer of heat from the exhaust stream 104 to the gas stream 102. Although shown in FIG. 1B as having a counter-flow configuration in which the streams 102, 104 generally flow parallel to each other in opposite directions, the first heat exchanger 111a can optionally have a different flow configuration, such as parallel flow configuration (streams 102, 104 generally flow parallel to each other in the same direction) or crossflow configuration (streams 102, 104 generally flow perpendicular to one another). The second side of the first heat exchanger 111a includes an outlet configured to discharge the exhaust stream 104. The exhaust stream 104 exiting the outlet of the second side of the first heat exchanger 111a can have an operating temperature less (colder) than that of the exhaust stream 104 entering the inlet of the second side of the first heat exchanger 111a.

The power and utility subsystem 110 includes a second heat exchanger 111b. The second heat exchanger 111b includes a first side and a second side. The exhaust stream 104 flows from the second side of the first heat exchanger 111a to the first side of the second heat exchanger 111b. The first side of the second heat exchanger 111b includes an inlet configured to receive the exhaust stream 104 from the first heat exchanger 111a. The exhaust stream 104 flows through the first side of the second heat exchanger 111b. The first side of the second heat exchanger 111b includes an outlet configured to discharge the exhaust stream 104. A working fluid 106 flows to the second side of the second heat exchanger 111b. The working fluid 106 is a fluid that acts as an intermediary heat transfer fluid for transferring heat between two different fluid streams. The working fluid 106 can be, for example, a heating oil, air, or water. The second side of the second heat exchanger 111b includes an inlet configured to receive the working fluid 106. The working fluid 106 flows through the second side of the second heat exchanger 111b. The second heat exchanger 111b is configured to transfer heat from the exhaust stream 104 flowing through the first side to the working fluid 106 flowing through the second side. The exhaust stream 104 and the working fluid 106 do not come into direct contact with one another in the second heat exchanger 111b. Instead, the second heat exchanger 111b provides an intermediary heat transfer area to facilitate transfer of heat from the exhaust stream 104 to the working fluid 106. Although shown in FIG. 1B as having a counter-flow configuration in which the streams 104, 106 generally flow parallel to each other in opposite directions, the second heat exchanger 111b can optionally have a different flow configuration, such as parallel flow configuration (streams 104, 106 generally flow parallel to each other in the same direction) or crossflow configuration (streams 104, 106 generally flow perpendicular to one another). The second side of the second heat exchanger 111b includes an outlet configured to discharge the working fluid 106. The exhaust stream 104 exiting the outlet of the first side of the second heat exchanger 111b can have an operating temperature less (colder) than that of the exhaust stream 104 entering the inlet of the first side of the second heat exchanger 111b. The working fluid 106 exiting the outlet of the second side of the second heat exchanger 111b can have an operating temperature greater (hotter) than that of the working fluid 106 entering the inlet of the second side of the second heat exchanger 111b. In some implementations, the exhaust stream 104 entering the inlet of the first side of the second heat exchanger 111b has an operating pressure in a range of from about 2 bara to about 5 bara. In some implementations, the exhaust stream 104 exiting the outlet of the first side of the second heat exchanger 111b has an operating pressure in a range of from about 1 bara to about 2 bara. In some implementations, the exhaust stream 104 entering the inlet of the first side of the second heat exchanger 111b has an operating temperature in a range of from about 650° C. to about 870° C., from about 650° C. to about 800° C., from about 830° C. to about 870° C., from about 840° C. to about 860° C., or from about 845° C. to about 855° C. (for example, about 850° C.). In some implementations, the exhaust stream 104 exiting the outlet of the first side of the second heat exchanger 111b has an operating temperature in a range of from about 150° C. to about 200° C., from about 140° C. to about 180° C., from about 150° C. to about 170° C., or from about 155° C. to about 165° C. (for example, about 160° C.).

The power and utility subsystem 110 includes a third heat exchanger 111c. The third heat exchanger 111c includes a first side and a second side. The working fluid 106 flows from the second side of the second heat exchanger 111b to the first side of the third heat exchanger 111c. The first side of the third heat exchanger 111c includes an inlet configured to receive the working fluid 106 from the second heat exchanger 111b. The working fluid 106 flows through the first side of the third heat exchanger 111c. The first side of the third heat exchanger 111c includes an outlet configured to discharge the working fluid 106. A water stream 108 flows to the second side of the third heat exchanger 111c. The second side of the third heat exchanger 111c includes an inlet configured to receive the water stream 108. The water stream 108 flows through the second side of the third heat exchanger 111c. The third heat exchanger 111c is configured to transfer heat from the working fluid 106 flowing through the first side to the water stream 108 flowing through the second side. The working fluid 106 and the water stream 108 do not come into direct contact with one another in the third heat exchanger 111c. Instead, the third heat exchanger 111c provides an intermediary heat transfer area to facilitate transfer of heat from the working fluid 106 to the water stream 108. Although shown in FIG. 1B as having a counter-flow configuration in which the streams 106, 108 generally flow parallel to each other in opposite directions, the third heat exchanger 111c can optionally have a different flow configuration, such as parallel flow configuration (streams 106, 108 generally flow parallel to each other in the same direction) or crossflow configuration (streams 106, 108 generally flow perpendicular to one another). The second side of the third heat exchanger 111c includes an outlet configured to discharge the water stream 108. The working fluid 106 exiting the outlet of the first side of the third heat exchanger 111c can have an operating temperature less (colder) than that of the working fluid 106 entering the inlet of the first side of the third heat exchanger 111c. The water stream 108 exiting the outlet of the second side of the third heat exchanger 111c can have an operating temperature greater (hotter) than that of the water stream 108 entering the inlet of the second side of the third heat exchanger 111c. The working fluid 106 thus acts as an intermediary heat transfer fluid that transfers heat from the exhaust stream 104 to the water stream 108 via heat exchangers 111b, 111c. In some implementations, the working fluid 106 flows from the outlet of the first side of the third heat exchanger 111c to the carbon dioxide recovery subsystem 170, where the working fluid 106 can, for example, be used for carbon dioxide separation, purification, and/or preparation for use as a product or diverting to a carbon sequestration reservoir.

The power and utility subsystem 110 includes a boiler 113. The water stream 108 flows from the third heat exchanger 111c to the boiler 113. The boiler 113 includes an inlet configured to receive the water stream 108 from the third heat exchanger 111c. The boiler 113 includes a heater that is configured to provide heat to the water stream 108, thereby boiling the water stream 108 to produce steam. The boiler 113 includes an outlet configured to discharge a steam stream 108' that includes the steam generated by the boiler 113. The boiler 113 can be any type of boiler known in the art, such as a hot water boiler, an electric boiler, a gas boiler, a low pressure boiler, a high pressure boiler, and oil boiler, a water tube boiler, a La Mont boiler, a Benson boiler, a Loeffler boiler, a fire tube boiler, or a shell boiler. In some implementations, a portion of the first portion 101a of the fuel stream 101 can be combusted by the boiler 113 to produce at least a portion of the necessary heat for boiling the water stream 108 to produce the steam stream 108'.

The hydrogen production subsystem 150 includes an air separation unit 152. Air 151 flows to the air separation unit 152. The air separation unit 152 separates oxygen 151a from a remaining portion 151b of the air 151. The air separation unit 152 can include typical equipment known in the art for separating oxygen from air, such as cryogenic distillation or non-cryogenic processes (for example, pressure swing adsorption or membrane technologies). The remaining portion 151b of the air 151 is substantially free of oxygen and can include, for example, nitrogen and carbon dioxide. In some implementations, nitrogen is separated from the air 151, such that the remaining portion 151b of the air 151 is substantially free of nitrogen. The remaining portion 151b of the air 151 is mixed with the second portion 101b of the fuel stream 101 and the steam 108' produced by the boiler 113 of the power and utility subsystem 110.

The hydrogen production subsystem 150 includes a heater 154. The mixture 153 (remaining portion 151b of the air 151, second portion 101b of the fuel stream 101, and steam 108') flows to the heater 154. The heater 154 heats the mixture 153, such that the mixture 153 exiting the heater 154 has an operating temperature that is greater (hotter) than the mixture 153 entering the heater 154. The heater 154 can include typical equipment known in the art for heating fluids, such as a heat exchanger, an electric heater, or a gas heater (for example, a furnace).

The hydrogen production subsystem 150 includes a reforming unit 156. The reforming unit 156 can include an autothermal reformer. The mixture 153 flows from the heater 154 to the reforming unit 156. The reforming unit 156 includes an inlet configured to receive the mixture 153 from the heater 154. The oxygen 151a flows from the air separation unit 152 to the reforming unit 156. In some implementations, the oxygen 151a mixes with the mixture 153 upstream of the reforming unit 156, and the mixture (oxygen 151a and mixture 153) flows into the reforming unit 156 via the inlet. In some implementations, the oxygen 151a flows into the reforming unit 156 separately from the mixture 153, for example, via a different inlet of the reforming unit 156. The autothermal reformer of the reforming unit 156 can include an autothermal reforming catalyst for accelerating a reaction of methane with oxygen, carbon dioxide, carbon monoxide, and steam to produce syngas 155, which is a mixture including hydrogen and carbon monoxide. The reforming unit 156 can include a partial oxidation reactor for reacting hydrocarbon(s) present in the mixture 153 with oxygen, carbon monoxide, carbon dioxide, and/or steam to produce the syngas 155. The reforming unit 156 partially oxidizes hydrocarbon(s) (such as methane). The oxidation of methane is exothermic. The reactions shown in Equations 1a and 1b occur within the autothermal reformer 156.

$$2CH_4 + O_2 + CO_2 \rightarrow 3H_2 + 3CO + H_2O \tag{1a}$$

$$4CH_4 + O_2 + 2H_2O \rightarrow 10H_2 + 4CO \tag{1b}$$

The partial oxidation of other hydrocarbons is also exothermic. The partial oxidation of hydrocarbons is generalized by Equation 2 and can occur within the reforming unit 156.

$$C_nH_m + \frac{n}{2}O_2 \rightarrow \frac{m}{2}H_2 + nCO \tag{2}$$

The reforming unit 156 includes an outlet configured to discharge the syngas 155 that was produced in the reforming unit 156. The syngas 155 includes hydrogen, carbon monoxide, and water (for example, in the form of steam). In some cases, the syngas 155 includes additional components, such as carbon dioxide.

The hydrogen production subsystem 150 includes a shift reactor 158. The syngas 155 flows from the reforming unit 156 to the shift reactor 158. The shift reactor 158 includes an inlet configured to receive the syngas 155 from the reforming unit 156. The shift reactor 158 includes a water-gas shift catalyst for accelerating a reaction between carbon monoxide and water to form carbon dioxide and hydrogen. Thus, additional hydrogen is produced within the shift reactor 158. Some non-limiting examples of water-gas shift catalysts include iron oxide-chromium oxide-based catalysts and copper-based catalysts. For example, the water-gas shift catalyst can include iron oxide, chromium oxide, magnesium oxide, copper oxide, zinc oxide, aluminum oxide, or any combinations of these. Methane is partially oxidized in the reforming unit 156. The oxidation of methane is exothermic. The equilibrium reaction shown in Equation 3 occurs within the shift reactor 158.

$$CO + H_2O \leftrightarrow CO_2 + H_2 \tag{3}$$

The shift reactor 158 includes an outlet configured to discharge a shifted syngas 157. The shifted syngas 155 includes hydrogen and carbon dioxide. In some cases, the shifted syngas 157 includes additional components, such as carbon monoxide and water. In comparison to the syngas 155 entering the shift reactor 158, the shifted syngas 157 exiting the shift reactor 158 includes a greater hydrogen gas content, a greater carbon dioxide content, a lesser carbon monoxide content, and a lesser water content.

The hydrogen production subsystem 150 includes a purification unit 160. The shifted syngas 157 flows from the shift reactor 158 to the purification unit 160. The purification unit 160 separates the shifted syngas 157 into a carbon dioxide stream 159 and a crude hydrogen stream 163. The composition of the carbon dioxide stream 159 is substantially comprised of carbon dioxide and is substantially free of other components, such as nitrogen, water, and hydrogen. The composition of the crude hydrogen stream 163 includes hydrogen and can include additional components, such as nitrogen and carbon monoxide. The purification unit 160 can include typical equipment known in the art for separating carbon dioxide from other gases, such as sorbent/solvent technologies, membrane technologies, and cryogenic distillation.

The hydrogen production subsystem 150 includes a compressor 162. The carbon dioxide stream 159 flows from the purification unit 160 to the compressor 162. The compressor 162 pressurizes the carbon dioxide stream 159 into a compressed carbon dioxide stream 161 for subsequent transport and/or sequestration. For example, the compressed carbon dioxide stream 161 can flow to the carbon dioxide recovery subsystem 170 for further pressurization and purification based on desired specifications. As another example, the compressed carbon dioxide stream 161 can be transported to a user or injected into a subterranean formation, such that the carbon dioxide is not released into the atmosphere.

The hydrogen production subsystem 150 includes a hydrogen separation unit 164. The crude hydrogen stream 163 flows from the purification unit 160 to the hydrogen separation unit 164. The hydrogen separation unit 160 separates hydrogen from the crude hydrogen stream 163 to produce a purified hydrogen stream 165. The composition of the purified hydrogen stream 165 is substantially comprised of hydrogen and is substantially free of other components. The hydrogen separation unit 164 can include typical equipment known in the art for separating hydrogen from other gases, such as pressure swing adsorption. The hydrogen stream 165 can flow, for example, to the ammonia production subsystem 190 to be reacted with nitrogen 192 to produce the ammonia 194. In some implementations, at least a portion of the nitrogen 192 used by the ammonia production subsystem 190 to produce the ammonia 194 can be sourced from the nitrogen that has been separated from the hydrogen by the hydrogen separation unit 164. In some implementations, at least a portion of the nitrogen 192 used by the ammonia production subsystem 190 to produce the ammonia 194 can be sourced from the nitrogen that has been separated from the air 151 by the air separation unit 152.

The carbon dioxide recovery subsystem 170 includes an inlet configured to receive at least a portion of the compressed carbon dioxide stream 161 from the hydrogen production subsystem 150. For example, a portion of or all of the compressed carbon dioxide stream 161 flows from the hydrogen production subsystem 150 to the carbon dioxide recovery subsystem 170. At least a portion of (for example, all of) the carbon dioxide 167 produced by the power and utility subsystem 110 (for example, from the exhaust stream 104) can flow from the power and utility subsystem 110 to the carbon dioxide recovery subsystem 170. In some implementations, the carbon dioxide 167 from the power and utility subsystem 110 flows into the carbon dioxide recovery subsystem 170 separately from the compressed carbon dioxide stream 161 from the hydrogen production subsystem 150, for example, via a different inlet of the carbon dioxide recovery subsystem 170. In some implementations, the carbon dioxide 167 from the power and utility subsystem 110 mixes with the compressed carbon dioxide stream 161 from the hydrogen production subsystem 150 and flows together into the carbon dioxide recovery subsystem 170. The carbon dioxide recovery subsystem 170 processes the carbon dioxide (161, 167) to produce a carbon dioxide stream 171 with characteristics matching its intended use, for example, for sale and/or transport to an end user or sequestration in a carbon sequestration reservoir. The carbon dioxide recovery subsystem 170 can include, for example, a compressor for pressurizing the carbon dioxide (161, 167). The carbon dioxide recovery subsystem 170 can include separation units, for example, a pressure swing adsorption unit and/or a molecular sieve unit for purifying the carbon dioxide (161, 167).

In each of the configurations described with respect to the system 100 (shown in FIG. 1A and partially in FIG. 1B) at its subsystems (such as the power and utility subsystem 110, the hydrogen production subsystem 150, and the ammonia production subsystem 190), process streams (also referred to as "streams") are flowed within each subsystem of the system 100 and between subsystems of the system 100. The process streams can be flowed using one or more flow control systems implemented throughout the system 100 (and/or its subsystems). A flow control system can include one or more flow pumps to pump the process streams (such as the steam 108'), one or more compressors to pressurize the process streams, one or more flow pipes through which the process streams are flowed, and one or more valves to regulate the flow of streams through the pipes.

In some implementations, a flow control system can be operated manually. For example, an operator can set a flow rate for each pump and/or compressor by changing the position of a valve (open, partially open, or closed) to regulate the flow of the process streams through the pipes in the flow control system. Once the operator has set the flow rates and the valve positions for all flow control systems distributed across the system 100 (and/or its subsystems), the flow control system can flow the streams within a unit or between units under constant flow conditions, for example, constant volumetric or mass flow rates. To change the flow conditions, the operator can manually operate the flow control system, for example, by changing the valve position.

In some implementations, a flow control system can be operated automatically. For example, the flow control system can be connected to a computer system to operate the flow control system. The computer system can include a computer-readable medium storing instructions (such as flow control instructions) executable by one or more processors to perform operations (such as flow control operations). For example, an operator can set the flow rates by setting the valve positions for all flow control systems distributed across the system 100 (and/or its subsystems) using the computer system. In such implementations, the operator can manually change the flow conditions by providing inputs through the computer system. In such implementations, the computer system can automatically (that is, without manual intervention) control one or more of the flow control systems, for example, using feedback systems implemented in one or more units and connected to the computer system. For example, a sensor (such as a pressure sensor or temperature sensor) can be connected to a pipe through which a process stream flows. The sensor can monitor and provide a flow conditions (such as a pressure or temperature) of the process stream to the computer system. In response to the flow condition deviating from a set point (such as a target pressure value or target temperature value) or exceeding a threshold (such as a threshold pressure value or threshold temperature value), the computer system can automatically perform operations. For example, if the pressure or temperature in the pipe exceeds the threshold pressure value or the threshold temperature value, respectively, the computer system can provide a signal to open a valve to relieve pressure or a signal to shut down process stream flow.

Figure 1C:
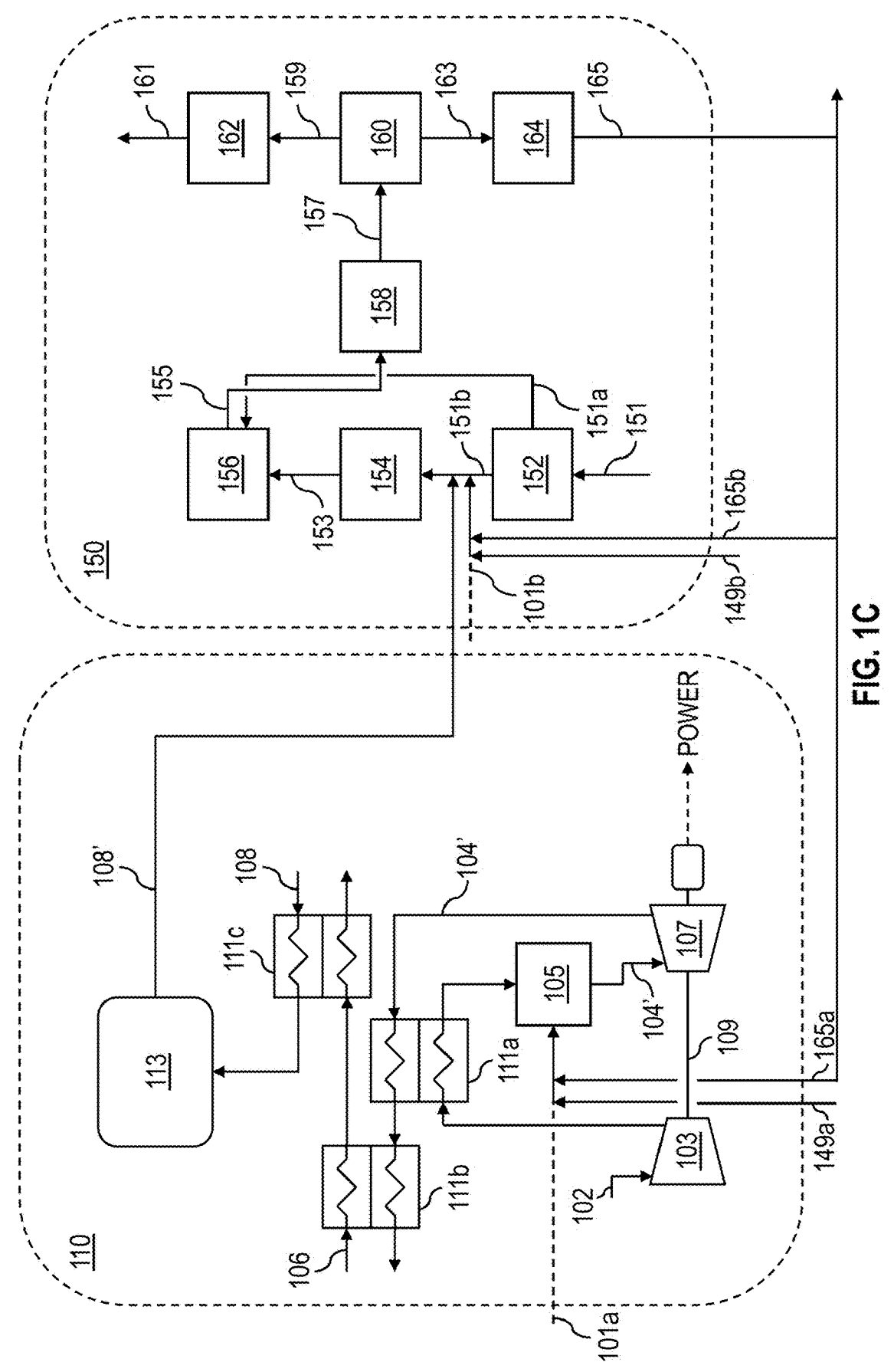
FIG. 1C is a schematic diagram of the system shown in FIG. 1B after startup has completed.

FIG. 1C is a schematic diagram of the system shown in FIG. 1B after startup has completed. After startup has completed and the hydrogen production subsystem 150 has begun to produce the hydrogen stream 165, the hydrogen stream 165 can be flowed from the hydrogen production subsystem 150 to the power and utility subsystem 110. The hydrogen stream 165 can be used by the power and utility subsystem 110 to generate power and/or steam. The hydrogen stream 165 can, for example, replace the first portion 101*a* of the fuel stream 101. By replacing the first portion 101*a* of the fuel stream 101 with the hydrogen stream 165, fuel consumption of the overall system (for example, the system 100) can be reduced. The hydrogen stream 165 can be combusted within the co-firing chamber 105 (for example, instead of the first portion 101*a* of the fuel stream 101). Combustion of hydrogen does not produce carbon dioxide. Instead, combustion of hydrogen produces water 104' (for example, in the form of steam). Combustion of the hydrogen stream 165 instead of the first portion 101*a* of the fuel stream 101 within the co-firing chamber 105 can therefore reduce the amount of carbon dioxide emissions produced by the system (for example, the system 100). In cases in which the hydrogen stream 165 replaces the first portion 101*a* of the fuel stream 101, the exhaust stream 104 is not produced, thereby reducing the amount of carbon dioxide emissions produced by the power and utility subsystem 110.

The water 104' produced from combustion of the hydrogen stream 165 by the co-firing chamber 105 can follow the same route as the exhaust stream 104 shown in FIG. 1B. For example, the water 104' (steam) can flow from the co-firing chamber 105 to the electric generator 107. The gas turbine inlet of the electric generator 107 can be configured to receive the water 104' (steam). As the water 104' (steam) flows through the gas turbine and expands, the impeller of the gas turbine rotates. Rotation of the impeller in relation to the stator of the electric generator 107 generates electrical power. The gas turbine outlet of the electric generator 107 can be configured to discharge the water 104' (steam).

The water 104' (steam) can flow from the electric generator 107 to the second side of the first heat exchanger 111*a*. The inlet of the second side of the first heat exchanger 111*a* can be configured to receive the water 104' from the electric generator 107. The water 104' (steam) can flow through the second side of the first heat exchanger 111*a*. The first heat exchanger 111*a* can be configured to transfer heat from the water 104' (steam) flowing through the second side to the gas stream 102 flowing through the first side. The gas stream 102 and the water 104' do not come into direct contact with one another in the first heat exchanger 111*a*. Instead, the first heat exchanger 111*a* provides an intermediary heat transfer area to facilitate transfer of heat from the water 104' to the gas stream 102. Although shown in FIG. 1C as having a counter-flow configuration in which the streams 102, 104' generally flow parallel to each other in opposite directions, the first heat exchanger 111*a* can optionally have a different flow configuration, such as parallel flow configuration (streams 102, 104' generally flow parallel to each other in the same direction) or crossflow configuration (streams 102, 104' generally flow perpendicular to one another). The outlet of the second side of the first heat exchanger 111*a* can be configured to discharge the water 104'. The water 104' exiting the outlet of the second side of the first heat exchanger 111*a* can have an operating temperature less (colder) than that of the water 104' entering the inlet of the second side of the first heat exchanger 111*a*. In some cases, the water 104' exiting the outlet of the second side of the first heat exchanger 111*a* is still vaporized (steam). In other cases, the water 104' exiting the outlet of the second side of the first heat exchanger 111*a* is at least partially condensed (for example, a 2-phase fluid including liquid water and steam or a single-phase fluid including liquid water).

The water 104' can flow from the second side of the first heat exchanger 111*a* to the first side of the second heat exchanger 111*b*. The inlet of the first side of the second heat exchanger 111*b* can be configured to receive the water 104' from the first heat exchanger 111*a*. The water 104' flows through the first side of the second heat exchanger 111*b*. The outlet of the first side of the second heat exchanger 111*b* can be configured to discharge the water 104'. The second heat exchanger 111*b* can be configured to transfer heat from the water 104' flowing through the first side to the working fluid 106 flowing through the second side. The water 104' and the working fluid 106 do not come into direct contact with one another in the second heat exchanger 111*b*. Instead, the second heat exchanger 111*b* provides an intermediary heat transfer area to facilitate transfer of heat from the water 104' to the working fluid 106. Although shown in FIG. 1C as having a counter-flow configuration in which the streams 104', 106 generally flow parallel to each other in opposite directions, the second heat exchanger 111*b* can optionally have a different flow configuration, such as parallel flow configuration (streams 104', 106 generally flow parallel to each other in the same direction) or crossflow configuration (streams 104', 106 generally flow perpendicular to one another). The outlet of the first side of the second heat exchanger 111*b* can be configured to discharge the water 104'. The water 104' exiting the outlet of the first side of the second heat exchanger 111*b* can have an operating temperature less (colder) than that of the water 104' entering the inlet of the first side of the second heat exchanger 111*b*. In some cases, the water 104' exiting the outlet of the first side of the second heat exchanger 111*b* is still vaporized (steam). In other cases, the water 104' exiting the outlet of the first side of the second heat exchanger 111*b* is at least partially condensed (for example, a 2-phase fluid including liquid water and steam or a single-phase fluid including liquid water). In cases in which the water 104' exiting the outlet of the first side of the second heat exchanger 111*b* is still vaporized (steam), the water 104' (steam) can supplement the steam stream 108', which is flowed to the heater 154 and then subsequently to the reforming unit 156. In cases in which the water 104' exiting the outlet of the first side of the second heat exchanger 111*b* is at least partially condensed (for example, a 2-phase fluid including liquid water and steam or a single-phase fluid including liquid water), the water 104' can supplement the water stream 108, which is flowed to the boiler 113 to generate the steam stream 108'. The concept shown in FIG. 1C in which the hydrogen stream 165 replaces the first portion 101*a* of the fuel stream 101 can be applied to any system that produces hydrogen and utilizes fuel combustion for producing electrical power.

FIG. 2 is a flow chart of a method 200 for producing ammonia. The system 100 can, for example, implement method 200. At block 202, a gas stream (such as the gas stream 102) is compressed to produce a compressed gas stream. As described previously, the gas stream 102 includes oxygen. The gas stream 102 can be compressed at block 202 by the compressor 103. At block 204, a first portion of a fuel stream (such as the first portion 101*a* of the fuel stream 101) is combusted in the presence of the compressed gas stream 102 to produce an exhaust stream (such as the exhaust stream 104). As described previously, the fuel stream 101 includes hydrogen atoms. The first portion 101*a* of the fuel stream 101 can be combusted at block 204 in the co-firing chamber 105. At block 206, the exhaust stream 104 is flowed to a turbine wheel of an electric generator (such as the electric generator 107), thereby causing the exhaust stream 104 to expand while flowing across the turbine wheel and the turbine wheel to rotate. At block 208, the electric generator 107 generates electrical power in response to rotation of the turbine wheel. At block 210, heat is transferred from the exhaust stream 104 to the compressed gas stream 102. The heat can be transferred from the exhaust stream 104 to the gas stream 102 at block 210 by the first heat exchanger 111*a*. At block 212, heat is transferred from the exhaust stream 104 to a working fluid (such as the working fluid 106). The heat can be transferred from the exhaust stream 104 to the working fluid 106 at block 212 by the second heat exchanger 111*b*. At block 214, heat is transferred from the working fluid 106 to a water stream (such as the water stream 108) for generating a steam stream (such as the steam stream 108'). The heat can be transferred from the working fluid 106 to the water stream 108 at block 214 by the third heat exchanger 111*c*. The water stream 108 can be boiled by the boiler 113 to generate the steam stream 108'. For example, the heat that is transferred from the working fluid 106 to the water stream 108 at block 214 can be a pre-heating step prior to boiling in the boiler 113 to generate the steam stream 108'. Thus, transferring heat from the working fluid 106 to the water stream 108 at block 214 can reduce the heating duty required by the boiler 113 to boil the water stream 108 to generate the steam stream 108'. At block 216, a second portion (such as the second portion 101*b*) of the fuel stream 101 is converted in the presence of oxygen and steam to produce a syngas stream (such as the syngas stream 155). The second portion 101*b* of the fuel stream 101 can be converted at block 216 by the reforming unit 156. The oxygen at block 216 can be, for example, the oxygen 151*a* separated from the air 151 by the air separation unit 152. The steam at block 216 can be, for example, the steam stream 108' or at least partially sourced from the steam stream 108'. At block 218, the syngas stream 155 is separated to produce a carbon dioxide stream (such as the carbon dioxide stream 161) and a hydrogen stream (such as the hydrogen stream 165). Separating the syngas stream 155 at block 218 can include processing the syngas stream 155, for example, by the shift reactor 158, the purification unit 160, and the hydrogen separation unit 164. At block 220, the hydrogen stream 165 is reacted with nitrogen (such as the nitrogen 192) to produce an ammonia stream (such as the ammonia 194). The hydrogen stream 165 can be reacted with the nitrogen 192 at block 220 by the ammonia production subsystem 194. At least a portion of the electrical power generated by the electric generator 107 at block 208 is used to convert the second portion 101*b* of the fuel stream 101 at block 216, separate the syngas stream 155 at block 218, react the hydrogen stream 165 with nitrogen at block 220, or any combinations of these.

FIG. 3 is a flow chart of a method 300 for producing ammonia. The system 100 can, for example, implement method 200. At block 302, an air stream (such as the gas stream 102) is pressurized by a compressor (such as the compressor 103) to produce a compressed air stream. At block 304, a first portion of a fuel stream (such as the first portion 101*a* of the fuel stream 101) is reacted within a combustion chamber (such as the co-firing chamber 105) in the presence of the oxygen of the compressed air stream (such as the gas stream 102) to produce an exhaust stream (such as the exhaust stream 104). At block 306, the exhaust stream 104 is flowed to a turbine wheel of an electric generator (such as the electric generator 107), thereby causing the turbine wheel to rotate. At block 308, the electric generator 107 generates electrical power in response to rotation of the turbine wheel. At block 310, heat is transferred by a first heat exchanger (such as the first heat exchanger 111*a*) from the exhaust stream 104 exiting the electric generator 107 to the compressed air stream. At block 312, heat is transferred by a second heat exchanger (such as the second heat exchanger 111*b*) from the exhaust stream 104 to a working fluid (such as the working fluid 106). At block 314, a water stream (such as the water stream 108) is boiled to produce a steam stream (such as the steam stream 108'). Boiling the water stream 108 at block 314 can include transferring heat by a third heat exchanger (such as the third heat exchanger 111*c*) from the working fluid 106 to the water stream 108 to pre-heat the water stream 108 and subsequently boiling the water stream 108 by the boiler 113. At block 316, a second portion (such as the second portion 101*b*) of the fuel stream 101 is converted in the presence of oxygen and steam within an autothermal reformer (such as the autothermal reformer of the reforming unit 156) to produce a syngas stream (such as the syngas stream 155). The oxygen at block 316 can be, for example, the oxygen 151*a* separated from the air 151 by the air separation unit 152. The steam at block 316 can be, for example, the steam stream 108' or at least partially sourced from the steam stream 108'. At block 318, at least a portion of carbon monoxide of the syngas stream 155 is converted within a shift reactor (such as the shift reactor 158) into carbon dioxide, and additional hydrogen is produced. Conversion of carbon monoxide of the syngas stream 155 at block 318 produces a shifted syngas stream (such as the shifted syngas stream 157). At block 320, the shifted syngas stream 157 is separated to produce a carbon dioxide stream (such as the carbon dioxide stream 161) and a hydrogen stream (such as the hydrogen stream 165). Separating the shifted syngas stream 157 at block 320 can include processing the shifted syngas stream 157, for example, by the purification unit 160 and the hydrogen separation unit 164. At block 322, the hydrogen stream 165 is reacted with nitrogen (such as the nitrogen 192) to produce an ammonia stream (such as the ammonia 194). The hydrogen stream 165 can be reacted with the nitrogen 192 at block 322 by the ammonia production subsystem 194. At least a portion of the electrical power generated by the electric generator 107 at block 308 is used to convert the second portion 101*b* of the fuel stream 101 at block 316, convert at least the portion of carbon monoxide of the syngas stream 155 at block 318, separate the shifted syngas stream 157 at block 320, react the hydrogen stream 165 with nitrogen at block 322, or any combinations of these.

Figure 4:
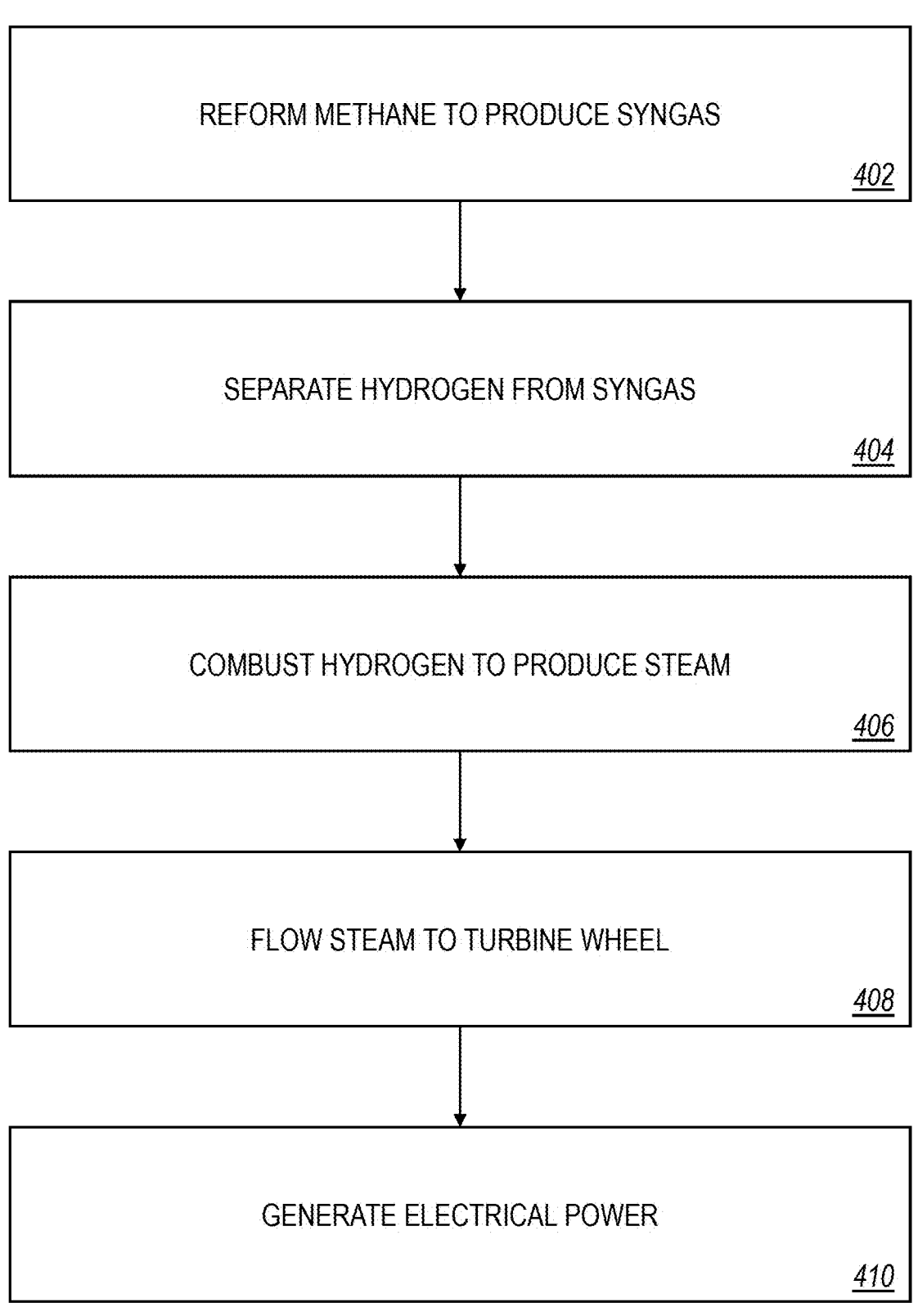
FIG. 4 is a flow chart of an example method for utilizing hydrogen produced by a reforming process as fuel to generate power.

FIG. 4 is a flow chart of an example method 400 for utilizing hydrogen produced by a reforming process as fuel to generate power. The system 100 (of which subsystems are shown in FIGS. 1B and 1C) can, for example, implement method 400. At block 402, a hydrocarbon stream (such as the second portion 101*b* of the fuel stream 101) is reformed in the presence of oxygen (such as the oxygen 151*b*) and steam (such as the steam 108', 104', or both) to produce a syngas stream (such as the syngas 153). Reforming the methane at block 402 can be performed, for example, by the reforming unit 156. At block 404, a hydrogen stream (such as the hydrogen stream 165) is separated from the syngas 153. Separating the hydrogen stream 165 from the syngas 153 at block 404 can be performed, for example, by the hydrogen separation unit 164. At block 406, the hydrogen stream 165 is combusted to produce a steam stream (such as the steam 104'). Combusting the hydrogen stream 165 at block 406 can be performed, for example, by the co-firing chamber 105. At block 408, the steam 104' is flowed to a turbine wheel of an electric generator (such as the electric generator 107), thereby causing the steam 104' to expand while flowing across the turbine wheel and causing the turbine wheel to rotate. At block 410, the electric generator 107 generates electrical power in response to rotation of the turbine wheel (block 408).

FIG. 5 is a flow chart of an example method 500 for utilizing hydrogen produced by a reforming process as fuel to generate power. The system 100 (of which subsystems are shown in FIGS. 1B and 1C) can, for example, implement method 500. At block 502, a gas stream (such as the gas stream 102) is compressed to produce a compressed gas stream. As described previously, the gas stream 102 includes oxygen. The gas stream 102 can be compressed at block 202 by the compressor 103. At block 2504, a first portion of a fuel stream (such as the first portion 101*a* of the fuel stream 101) is combusted in the presence of the compressed gas stream 102 to produce a first exhaust stream (such as the exhaust stream 104). As described previously, the fuel stream 101 includes hydrogen atoms. The first portion 101*a* of the fuel stream 101 can be combusted at block 204 in the co-firing chamber 105. At block 506, the exhaust stream 104 is flowed to a turbine of an electric generator (such as the electric generator 107), thereby causing the exhaust stream 104 to expand while flowing across the turbine wheel and the turbine wheel to rotate. At block 508, the electric generator 107 generates electrical power in response to rotation of the turbine wheel (block 506). At block 510, heat is transferred from the exhaust stream 104 to the compressed gas stream 102. The heat can be transferred from the exhaust stream 104 to the gas stream 102 at block 510 by the first heat exchanger 111*a*. At block 512, heat is transferred from the exhaust stream 104 to a working fluid (such as the working fluid 106). The heat can be transferred from the exhaust stream 104 to the working fluid 106 at block 512 by the second heat exchanger 111*b*. At block 514, heat is transferred from the working fluid 106 to a water stream (such as the water stream 108) for generating a steam stream (such as the steam stream 108'). The heat can be transferred from the working fluid 106 to the water stream 108 at block 514 by the third heat exchanger 111*c*. The water stream 108 can be boiled by the boiler 113 to generate the steam stream 108'. For example, the heat that is transferred from the working fluid 106 to the water stream 108 at block 214 can be a pre-heating step prior to boiling in the boiler 113 to generate the steam stream 108'. Thus, transferring heat from the working fluid 106 to the water stream 108 at block 214 can reduce the heating duty required by the boiler 113 to boil the water stream 108 to generate the steam stream 108'. At block 516, a second portion (such as the second portion 101*b*) of the fuel stream 101 is converted in the presence of oxygen and steam to produce a syngas stream (such as the syngas stream 155). The second portion 101*b* of the fuel stream 101 can be converted at block 516 by the reforming unit 156. The oxygen at block 516 can be, for example, the oxygen 151*a* separated from the air 151 by the air separation unit 152. The steam at block 516 can be, for example, the steam stream 108' or at least partially sourced from the steam stream 108'. At block 518, a hydrogen stream (such as the hydrogen stream 165) is separated from the syngas stream 155. Separating the syngas stream 155 at block 518 can include processing the syngas stream 155, for example, by the shift reactor 158, the purification unit 160, and the hydrogen separation unit 164. At block 520, the first portion 101*a* of the fuel stream 101 is replaced with the hydrogen stream 165. At block 522, the hydrogen stream 165 is combusted instead of the first portion 101*a* of the fuel stream 101 in the presence of the compressed gas stream 102 to produce a second exhaust stream (such as the steam 104').

The method 500 can then proceed back to block 506, in which the steam 104' (instead of the first exhaust stream 104) is flowed to the turbine wheel of the electric generator 107. The method 500 can include cycling through blocks 506, 508, 510, 512, 514, 516, and 520 (for example, once startup of the system 100 has completed).

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "of" is used to refer to a nonexclusive "of" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

Embodiments

In an example implementation (or aspect), a method comprises: compressing a gas stream comprising oxygen to produce a compressed gas stream; combusting a first portion of a fuel stream comprising hydrogen atoms in the presence of the compressed gas stream to produce an exhaust stream; flowing the exhaust stream to a turbine wheel of an electric generator, thereby causing the exhaust stream to expand while flowing across the turbine wheel and the turbine wheel to rotate; generating, by the electric generator, electrical power in response to rotation of the turbine wheel; transferring heat from to the exhaust stream to the compressed gas stream; after transferring heat from the compressed gas stream to the exhaust stream, transferring heat from the exhaust stream to a working fluid; after transferring heat from the exhaust stream to the working fluid, transferring heat from the working fluid to a water stream for generating a steam stream; converting a second portion of the fuel stream in the presence of oxygen and steam to produce a syngas stream, wherein at least a portion of the steam is sourced from the steam stream generated from the water stream; separating the syngas stream to produce a carbon dioxide stream and a hydrogen stream; and reacting the hydrogen stream with nitrogen to produce an ammonia stream, wherein at least a portion of the electrical power generated by the electric generator is used to convert the second portion of the fuel stream, separate the syngas stream, react the hydrogen stream with nitrogen, or any combinations thereof.

In an example implementation (or aspect) combinable with any other example implementation (or aspect), the gas stream is compressed by a compressor that is coupled to the electric generator, wherein the compressor comprises an impeller coupled to a shaft, wherein the shaft of the compressor is coupled to the turbine wheel of the electric generator and rotates with the turbine wheel, wherein rotation of the impeller of the compressor causes the gas stream to compress.

In an example implementation (or aspect) combinable with any other example implementation (or aspect), the method comprises: flowing at least a portion of the steam stream to a second turbine wheel of a second electric generator, thereby causing the portion of the steam stream to expand while flowing across the second turbine wheel and the second turbine wheel to rotate; and generating, by the second electric generator, electrical power in response to rotation of the second turbine wheel.

In an example implementation (or aspect) combinable with any other example implementation (or aspect), the method comprises converting at least a portion of carbon monoxide of the syngas stream into carbon dioxide and produce additional hydrogen, thereby producing a shifted syngas stream.

In an example implementation (or aspect) combinable with any other example implementation (or aspect), separating the syngas stream comprises: separating carbon dioxide from the shifted syngas stream, thereby producing the carbon dioxide stream; and separating hydrogen from a remaining portion of the shifted syngas stream after the carbon dioxide has been separated, thereby producing the hydrogen stream.

In an example implementation (or aspect), a method comprises: pressurizing, by a compressor, an air stream comprising oxygen to produce a compressed air stream; reacting, within a combustion chamber, a first portion of a fuel stream comprising hydrogen atoms in the presence of the oxygen of the compressed air stream to produce an exhaust stream; flowing the exhaust stream to a turbine wheel of an electric generator, thereby causing the turbine wheel to rotate; generating, by the electric generator, electrical power in response to rotation of the turbine wheel; transferring, by a first heat exchanger, heat from the exhaust stream exiting the electric generator to the compressed air stream; transferring, by a second heat exchanger, heat from the exhaust stream to a working fluid; boiling a water stream to produce a steam stream, wherein boiling the water stream comprises transferring heat from the working fluid to the water stream; converting, within a reforming unit, a second portion of the fuel stream in the presence of oxygen and steam to produce a syngas stream, wherein at least a portion of the steam is sourced from the steam stream; converting, within a shift reactor, at least a portion of carbon monoxide of the syngas stream into carbon dioxide and producing additional hydrogen, thereby producing a shifted syngas stream; separating the shifted syngas stream to produce a carbon dioxide stream and a hydrogen stream; and reacting the hydrogen stream with nitrogen to produce an ammonia stream, wherein at least a portion of the electrical power generated by the electric generator is used to convert the second portion of the fuel stream, convert at least the portion of carbon monoxide of the syngas stream, separate the shifted syngas stream, react the hydrogen stream with nitrogen, or any combinations thereof.

In an example implementation (or aspect) combinable with any other example implementation (or aspect), the compressor is coupled to the electric generator, wherein the compressor comprises an impeller coupled to a shaft, wherein the shaft of the compressor is coupled to the turbine wheel of the electric generator and rotates with the turbine wheel, wherein rotation of the impeller of the compressor causes the air stream to pressurize.

In an example implementation (or aspect) combinable with any other example implementation (or aspect), the method comprises: flowing at least a portion of the steam stream to a second turbine wheel of a second electric generator, thereby causing the portion of the steam stream to expand while flowing across the second turbine wheel and the second turbine wheel to rotate; and generating, by the second electric generator, electrical power in response to rotation of the second turbine wheel.

In an example implementation (or aspect) combinable with any other example implementation (or aspect), separating the shifted syngas stream comprises separating carbon dioxide from a remaining portion of the shifted syngas stream to produce the carbon dioxide stream and separating hydrogen from a remaining portion of the shifted syngas stream after the carbon dioxide has been separated to produce the hydrogen stream.

In an example implementation (or aspect) combinable with any other example implementation (or aspect), the exhaust stream comprises approximately 75 mole percent (mol. %) nitrogen and a balance of oxygen, carbon dioxide, and water.

In an example implementation (or aspect) combinable with any other example implementation (or aspect), the nitrogen that is reacted with the hydrogen stream is at least partially sourced from the exhaust stream.

In an example implementation (or aspect) combinable with any other example implementation (or aspect), the electric generator generates sufficient electrical power for converting the second portion of the fuel stream, converting at least the portion of carbon monoxide of the syngas stream, separating the shifted syngas stream, and reacting the hydrogen stream with nitrogen, independent of power importation.

In an example implementation (or aspect), a system comprises: a fuel stream comprising hydrogen atoms; a hydrogen production subsystem comprising a reforming unit configured to receive and react a first portion of the fuel stream, steam, and oxygen to produce a syngas stream, wherein the hydrogen production subsystem is configured to separate the syngas stream into a carbon dioxide stream and a hydrogen stream; an ammonia production subsystem configured to receive the hydrogen stream from the hydrogen production subsystem and nitrogen, wherein the ammonia production subsystem is configured to react the hydrogen stream with the nitrogen to produce an ammonia stream; and a power and utility subsystem configured to receive a second portion of the fuel stream, wherein the power and utility subsystem is electrically connected to at least one of the hydrogen production subsystem or the ammonia production subsystem for providing electrical power to the at least one of the hydrogen production subsystem or the ammonia production subsystem, wherein the power and utility subsystem comprises: a compressor configured to receive and compress a gas stream comprising oxygen to produce a compressed gas stream; a complementary firing chamber configured to receive a fuel stream and the compressed gas stream, wherein the combustion chamber is configured to combust the fuel stream in the presence of the oxygen of the compressed gas stream to produce an exhaust stream; an electric generator in fluid communication with the complementary firing chamber, wherein the electric generator is configured to receive the exhaust stream and generate electrical power in response to expansion of the exhaust stream through the electric generator; a first heat exchanger configured to transfer heat from the gas stream exiting the compressor to the exhaust stream exiting the electric generator to heat the exhaust stream; and a second heat exchanger configured to transfer heat from the exhaust stream exiting the first heat exchanger to a working fluid to heat the working fluid.

In an example implementation (or aspect) combinable with any other example implementation (or aspect), the electric generator is coupled to the compressor, wherein the electric generator comprises a turbine wheel configured to rotate in response to the exhaust stream flowing and expanding across the turbine wheel of the electric generator, wherein the compressor comprises an impeller coupled to a shaft, wherein the shaft of the compressor is coupled to the turbine wheel of the electric generator and rotates with the turbine wheel for compressing the gas stream.

In an example implementation (or aspect) combinable with any other example implementation (or aspect), the power and utility subsystem further comprises a third heat exchanger configured to transfer heat from at least a portion of the working fluid to a water stream to preheat the water stream.

In an example implementation (or aspect) combinable with any other example implementation (or aspect), the power and utility subsystem further comprises: a boiler in fluid communication with the third heat exchanger, wherein the boiler is configured to receive the water stream from the third heat exchanger and boil the water stream to produce steam; and a second electric generator in fluid communication with the boiler, wherein the second electric generator is configured to receive at least a portion of the steam produced by the boiler and generate electrical power in response to expansion of the steam through the second electric generator.

In an example implementation (or aspect) combinable with any other example implementation (or aspect), the boiler of the power and utility subsystem is in fluid communication with the hydrogen production subsystem, wherein at least a portion of the steam received by the hydrogen production subsystem is sourced from the boiler.

In an example implementation (or aspect) combinable with any other example implementation (or aspect), the hydrogen production subsystem further comprises: a shift reactor configured to receive the syngas from the reforming unit and convert at least a portion of carbon monoxide of the syngas into carbon dioxide and produce additional hydrogen for producing a shifted syngas stream; and a separation unit configured to separate carbon dioxide from the shifted syngas stream, thereby producing the carbon dioxide stream, wherein the separation unit is configured to separate hydrogen from a remaining portion of the shifted syngas stream after the carbon dioxide has been separated, thereby producing the hydrogen stream.

In an example implementation (or aspect) combinable with any other example implementation (or aspect), wherein the system comprises a separation unit configured to separate nitrogen from the exhaust stream, wherein the nitrogen that is reacted with the hydrogen stream by the ammonia production subsystem is at least partially sourced from the nitrogen separated from the exhaust stream by the separation unit.

In an example implementation (or aspect) combinable with any other example implementation (or aspect), the power and utility subsystem is configured to generate sufficient electrical power for delivery to the hydrogen production subsystem to produce the carbon dioxide stream and the hydrogen stream and for delivery to the ammonia production subsystem to produce the ammonia stream, independent of power importation.

In an example implementation (or aspect), a method comprises: reforming a hydrocarbon stream in the presence of oxygen and steam to produce a syngas stream; separating a hydrogen stream from the syngas stream; combusting the hydrogen stream to produce a steam stream; flowing the steam stream to a turbine wheel of an electric generator, thereby causing the steam stream to expand while flowing across the turbine wheel and the turbine wheel to rotate; and generating, by the electric generator, electrical power in response to rotation of the turbine wheel.

In an example implementation (or aspect) combinable with any other example implementation (or aspect), the turbine wheel of the electric generator is coupled to a shaft of a compressor, wherein the compressor comprises an impeller coupled to the shaft, wherein the shaft and the impeller of the compressor rotate with the turbine wheel, wherein rotation of the impeller of the compressor provides compression work.

In an example implementation (or aspect) combinable with any other example implementation (or aspect), the syngas stream, produced from reforming the hydrocarbon stream, comprises carbon monoxide and hydrogen, wherein the method comprises converting at least a portion of the carbon monoxide of the syngas stream to produce carbon dioxide and additional hydrogen, thereby producing a shifted syngas stream prior to separating the hydrogen stream.

In an example implementation (or aspect) combinable with any other example implementation (or aspect), the hydrogen stream is separated from the shifted syngas stream, and separating the hydrogen stream from the shifted syngas stream comprises: separating the carbon dioxide from the shifted syngas stream to produce a carbon dioxide stream; and separating hydrogen from a remaining portion of the shifted syngas stream after the carbon dioxide has been separated to produce the hydrogen stream.

In an example implementation (or aspect), a method comprises: compressing a gas stream comprising oxygen to produce a compressed gas stream; combusting a first portion of a fuel stream comprising hydrogen atoms in the presence of the compressed gas stream to produce a first exhaust stream; flowing the first exhaust stream to a turbine wheel of an electric generator, thereby causing the first exhaust stream to expand while flowing across the turbine wheel and the turbine wheel to rotate; generating, by the electric generator, electrical power in response to rotation of the turbine wheel; transferring heat from the first exhaust stream to the compressed gas stream; after transferring heat from the compressed gas stream to the first exhaust stream, transferring heat from the exhaust stream to a working fluid; after transferring heat from the exhaust stream to the working fluid, transferring heat from the working fluid to a water stream to generate a steam stream; converting a second portion of the fuel stream in the presence of oxygen and steam to produce a syngas stream, wherein at least a portion of the steam is sourced from the steam stream generated from the water stream; separating a hydrogen stream from the syngas stream; replacing the first portion of the fuel stream with the hydrogen stream; and combusting the hydrogen stream instead of the first portion of the fuel stream in the presence of the compressed gas stream to produce a second exhaust stream.

In an example implementation (or aspect) combinable with any other example implementation (or aspect), the compressor is coupled to the electric generator, wherein the compressor comprises an impeller coupled to a shaft, wherein the shaft of the compressor is coupled to the turbine wheel of the electric generator and rotates with the turbine wheel, wherein rotation of the impeller of the compressor causes the air stream to pressurize.

In an example implementation (or aspect) combinable with any other example implementation (or aspect), the method comprises: flowing at least a portion of the steam stream to a second turbine wheel of a second electric generator, thereby causing the portion of the steam stream to expand while flowing across the second turbine wheel and the second turbine wheel to rotate; and generating, by the second electric generator, electrical power in response to rotation of the second turbine wheel.

In an example implementation (or aspect) combinable with any other example implementation (or aspect), the syngas stream comprises carbon monoxide and hydrogen, wherein the method comprises converting, within a shift reactor, at least a portion of the carbon monoxide of the syngas stream to produce carbon dioxide and additional hydrogen, thereby producing a shifted syngas stream prior to separating the hydrogen stream.

In an example implementation (or aspect) combinable with any other example implementation (or aspect), the hydrogen stream is separated from the shifted syngas stream, and separating the hydrogen stream from the shifted syngas stream comprises: separating carbon dioxide from the shifted syngas stream to produce a carbon dioxide stream; and separating hydrogen from a remaining portion of the shifted syngas stream after the carbon dioxide has been separated to produce the hydrogen stream.

In an example implementation (or aspect) combinable with any other example implementation (or aspect), the electric generator generates sufficient electrical power for converting the second portion of the fuel stream, converting at least the portion of carbon monoxide of the syngas stream, and separating the shifted syngas stream, independent of power importation.

In an example implementation (or aspect) combinable with any other example implementation (or aspect), the first exhaust stream comprises approximately 75 mole percent (mol. %) nitrogen and a balance of oxygen, carbon dioxide, and water.

In an example implementation (or aspect) combinable with any other example implementation (or aspect), the nitrogen that is reacted with the hydrogen stream is at least partially sourced from the exhaust stream.

In an example implementation (or aspect), a system comprises: a fuel stream comprising hydrogen atoms; a reforming unit configured to receive and react a first portion of the fuel stream with steam and oxygen to produce a syngas stream; a separation unit configured to separate a hydrogen stream from the syngas stream; and a power and utility unit configured to receive at least a portion of the hydrogen stream from the separation unit, wherein the power and utility unit comprises: a compressor configured to receive and compress a gas stream comprising oxygen to produce a compressed gas stream; a complementary firing chamber configured to receive the compressed gas stream and at least one of a second portion of the fuel stream or the portion of the hydrogen stream, wherein the complementary firing chamber is configured to combust at least one of the second portion of the fuel stream or the portion of the hydrogen stream in the presence of the oxygen of the compressed gas stream to produce an exhaust stream; and an electric generator in fluid communication with the complementary firing chamber, wherein the electric generator is configured to receive the exhaust stream and generate electrical power in response to expansion of the exhaust stream through the electric generator.

In an example implementation (or aspect) combinable with any other example implementation (or aspect), the electric generator is coupled to the compressor, wherein the electric generator comprises a turbine wheel configured to rotate in response to the exhaust stream flowing and expanding across the turbine wheel of the electric generator, wherein the compressor comprises an impeller coupled to a shaft, wherein the shaft of the compressor is coupled to the turbine wheel of the electric generator and rotates with the turbine wheel for compressing the gas stream.

In an example implementation (or aspect) combinable with any other example implementation (or aspect), the power and utility unit comprises: a boiler configured to receive a water stream and boil the water stream to produce steam; and a second electric generator in fluid communication with the boiler, wherein the second electric generator is configured to receive at least a portion of the steam produced by the boiler and generate electrical power in response to expansion of the steam through the second electric generator.

In an example implementation (or aspect) combinable with any other example implementation (or aspect), the syngas stream produced by the reforming unit comprises carbon monoxide and hydrogen, and the system comprises a shift reactor configured to receive the syngas stream from the reforming unit and convert at least a portion of the carbon monoxide of the syngas stream to produce carbon dioxide and additional hydrogen, thereby producing a shifted syngas stream.

In an example implementation (or aspect) combinable with any other example implementation (or aspect), the separation unit is configured to receive the shifted syngas stream from the shift reactor and separate carbon dioxide from the shifted syngas stream to produce a carbon dioxide stream, wherein the separation unit is configured to separate hydrogen from a remaining portion of the shifted syngas stream after the carbon dioxide has been separated to produce the hydrogen stream.

In an example implementation (or aspect) combinable with any other example implementation (or aspect), the power and utility unit is configured to generate sufficient electrical power for delivery to the compressor for compressing the gas stream to produce the compressed gas stream, to the reforming unit for reacting the first portion of the fuel stream with steam and oxygen to produce the syngas stream, and to the separation unit for separating carbon dioxide from the shifted syngas stream to produce the carbon dioxide stream and for separating hydrogen from the remaining portion of the shifted syngas stream to produce the hydrogen stream, independent of power importation.

In an example implementation (or aspect) combinable with any other example implementation (or aspect), the system comprises a hydrogen flowline from the separation unit to the complementary firing chamber, wherein the hydrogen flowline is configured to flow at least the portion of the hydrogen stream from the separation unit to the complementary firing chamber, wherein the complementary firing chamber is configured to combust at least the portion of the hydrogen stream in the presence of the oxygen of the compressed gas stream to produce the exhaust stream, wherein the exhaust stream comprises water.

In an example implementation (or aspect) combinable with any other example implementation (or aspect), the water stream comprises at least a portion of the water of the exhaust stream.

What is claimed is:

1. A method comprising:
compressing a gas stream comprising oxygen to produce a compressed gas stream;
combusting a first portion of a fuel stream comprising hydrogen atoms in the presence of the compressed gas stream to produce a first exhaust stream;
flowing the first exhaust stream to a turbine wheel of an electric generator, thereby causing the first exhaust stream to expand while flowing across the turbine wheel and the turbine wheel to rotate;
generating, by the electric generator, electrical power in response to rotation of the turbine wheel;
transferring heat from the first exhaust stream to the compressed gas stream;

after transferring heat from the compressed gas stream to the first exhaust stream, transferring heat from the exhaust stream to a working fluid;
after transferring heat from the exhaust stream to the working fluid, transferring heat from the working fluid to a water stream to generate a steam stream;
converting a second portion of the fuel stream in a presence of oxygen and steam to produce a syngas stream, wherein at least a portion of the steam is sourced from the steam stream generated from the water stream;
separating a hydrogen stream from the syngas stream;
replacing the first portion of the fuel stream with the hydrogen stream; and
combusting the hydrogen stream instead of the first portion of the fuel stream in the presence of the compressed gas stream to produce a second exhaust stream.

2. The method of claim 1, wherein a compressor is coupled to the electric generator, wherein the compressor comprises an impeller coupled to a shaft, wherein the shaft of the compressor is coupled to the turbine wheel of the electric generator and rotates with the turbine wheel, wherein rotation of the impeller of the compressor causes the gas stream to pressurize.

3. The method of claim 2, comprising:
flowing at least a portion of the steam stream to a second turbine wheel of a second electric generator, thereby causing the portion of the steam stream to expand while flowing across the second turbine wheel and the second turbine wheel to rotate; and
generating, by the second electric generator, electrical power in response to rotation of the second turbine wheel.

4. The method of claim 2, wherein the syngas stream comprises carbon monoxide and hydrogen, wherein the method comprises converting, within a shift reactor, at least a portion of the carbon monoxide of the syngas stream to produce carbon dioxide and additional hydrogen, thereby producing a shifted syngas stream prior to separating the hydrogen stream.

5. The method of claim 4, wherein the hydrogen stream is separated from the shifted syngas stream, and separating the hydrogen stream from the shifted syngas stream comprises: separating the carbon dioxide from the shifted syngas stream to produce a carbon dioxide stream; and separating hydrogen from a remaining portion of the shifted syngas stream after the carbon dioxide has been separated to produce the hydrogen stream.

6. The method of claim 5, wherein the electric generator generates sufficient electrical power for converting the second portion of the fuel stream, converting at least the portion of carbon monoxide of the syngas stream, and separating the shifted syngas stream, independent of power importation.

7. The method of claim 2, wherein the first exhaust stream comprises approximately 75 mole percent (mol. %) nitrogen and a balance of oxygen, carbon dioxide, and water.

8. The method of claim 7, wherein the nitrogen that is reacted with the hydrogen stream is at least partially sourced from the exhaust stream.

9. A system comprising:
a fuel stream comprising hydrogen atoms;
a reforming unit configured to receive and react a first portion of the fuel stream with steam and oxygen to produce a syngas stream;
a separation unit configured to separate a hydrogen stream from the syngas stream; and a power and utility unit configured to receive at least a portion of the hydrogen stream from the separation unit, wherein the power and utility unit comprises:

a compressor configured to receive and compress a gas stream comprising oxygen to produce a compressed gas stream;

a complementary firing chamber configured to receive the compressed gas stream and at least one of a second portion of the fuel stream or the portion of the hydrogen stream, wherein the complementary firing chamber is configured to combust at least one of the second portion of the fuel stream or the portion of the hydrogen stream in the presence of the oxygen of the compressed gas stream to produce an exhaust stream;

wherein, at startup, the power and utility unit combusts the second portion of the fuel stream in the complementary firing chamber, after startup, when the portion of the hydrogen stream is produced, the power and utility unit combusts the portion of the hydrogen stream in the complementary firing chamber such that the second portion of the fuel stream is partially or fully replaced; and an electric generator in fluid communication with the complementary firing chamber, wherein the electric generator is configured to receive the exhaust stream and generate electrical power in response to expansion of the exhaust stream through the electric generator.

10. The system of claim 9, wherein the electric generator is coupled to the compressor, wherein the electric generator comprises a turbine wheel configured to rotate in response to the exhaust stream flowing and expanding across the turbine wheel of the electric generator, wherein the compressor comprises an impeller coupled to a shaft, wherein the shaft of the compressor is coupled to the turbine wheel of the electric generator and rotates with the turbine wheel for compressing the gas stream.

11. The system of claim 10, wherein the power and utility unit comprises:

a boiler configured to receive a water stream and boil the water stream to produce steam; and a second electric generator in fluid communication with the boiler, wherein the second electric generator is configured to receive at least a portion of the steam produced by the boiler and generate electrical power in response to expansion of the steam through the second electric generator.

12. The system of claim 11, wherein the syngas stream produced by the reforming unit comprises carbon monoxide and hydrogen, and the system comprises a shift reactor configured to receive the syngas stream from the reforming unit and convert at least a portion of the carbon monoxide of the syngas stream to produce carbon dioxide and additional hydrogen, thereby producing a shifted syngas stream.

13. The system of claim 12, wherein the separation unit is configured to receive the shifted syngas stream from the shift reactor and separate carbon dioxide from the shifted syngas stream to produce a carbon dioxide stream, wherein the separation unit is configured to separate hydrogen from a remaining portion of the shifted syngas stream after the carbon dioxide has been separated to produce the hydrogen stream.

14. The system of claim 13, wherein the power and utility unit is configured to generate sufficient electrical power for delivery to the compressor for compressing the gas stream to produce the compressed gas stream, to the reforming unit for reacting the first portion of the fuel stream with the steam and the oxygen to produce the syngas stream, and to the separation unit for separating the carbon dioxide from the shifted syngas stream to produce the carbon dioxide stream and for separating the hydrogen from the remaining portion of the shifted syngas stream to produce the hydrogen stream, independent of power importation.

15. The system of claim 14, comprising a hydrogen flowline from the separation unit to the complementary firing chamber, wherein the hydrogen flowline is configured to flow at least the portion of the hydrogen stream from the separation unit to the complementary firing chamber, wherein the complementary firing chamber is configured to combust at least the portion of the hydrogen stream in the presence of the oxygen of the compressed gas stream to produce the exhaust stream, wherein the exhaust stream comprises water.

16. The system of claim 15, wherein the water stream comprises at least a portion of the water of the exhaust stream.

* * * * *